United States Patent
Rico Alvarino et al.

(10) Patent No.: US 10,172,155 B2
(45) Date of Patent: Jan. 1, 2019

(54) BUNDLING AND HYBRID AUTOMATIC REPEAT REQUEST OPERATION FOR ENHANCED MACHINE-TYPE COMMUNICATION

(71) Applicant: QUALCOMM Incorporated, San Diego, CA (US)

(72) Inventors: Alberto Rico Alvarino, San Diego, CA (US); Wanshi Chen, San Diego, CA (US); Hao Xu, San Deigo, CA (US); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 117 days.

(21) Appl. No.: 15/217,445

(22) Filed: Jul. 22, 2016

(65) Prior Publication Data

US 2017/0034850 A1 Feb. 2, 2017

Related U.S. Application Data

(60) Provisional application No. 62/198,601, filed on Jul. 29, 2015.

(51) Int. Cl.
*H04W 72/14* (2009.01)
*H04W 4/70* (2018.01)
(Continued)

(52) U.S. Cl.
CPC .............. *H04W 72/14* (2013.01); *H04L 1/08* (2013.01); *H04L 1/1822* (2013.01);
(Continued)

(58) Field of Classification Search
CPC ............. H04W 72/14; H04W 72/0413; H04W 72/0446; H04L 1/822; H04L 5/16; H04L 43/19
See application file for complete search history.

(56) References Cited

U.S. PATENT DOCUMENTS

| 7,949,812 B1 * | 5/2011 | Wong | ................... | H04W 48/02 370/345 |
| 2009/0147755 A1 | 6/2009 | Liu et al. | | |

(Continued)

FOREIGN PATENT DOCUMENTS

WO WO-2009042158 A2 4/2009

OTHER PUBLICATIONS

Ericsson, "HARQ and TTI Bundling for Rel;-13 Low Complexity and Coverage Enhanced UEs," 3GPP TSG-RAN WG2 Meeting #90, Tdoc R2-152651, Fukuoka, Japan, May 25-29, 2015, 12 pgs., XP050973534, 3rd Generation Partnership Project.

(Continued)

*Primary Examiner* — Chi Ho A Lee
(74) *Attorney, Agent, or Firm* — Holland & Hart LLP

(57) ABSTRACT

Methods, systems, and devices for wireless communication are described. A user equipment (UE), which may be a machine-type communication device and may have a half-duplex capability, may receive grants for uplink resources and downlink resources that overlap in time. The UE may prioritize the grants and either drop the low priority grant or may monitor a non-overlapping portion of resources assigned by the lower priority grant, for example. The UE may determine an acknowledgement mode for the downlink transmission based on one or more grants or on an explicit indication from a base station in some examples. A control format indicator may be interpreted based on the grant or on the bundling size. In some cases, the UE may identify a retuning time (e.g., for switching between transmit and receive modes or for switching frequencies) and may determine uplink and downlink bundling sizes based on the retuning time.

35 Claims, 23 Drawing Sheets

(51) Int. Cl.
*H04L 1/18* (2006.01)
*H04L 12/26* (2006.01)
*H04W 72/04* (2009.01)
*H04L 1/08* (2006.01)
*H04L 5/00* (2006.01)
*H04L 5/16* (2006.01)

(52) U.S. Cl.
CPC .......... *H04L 5/0044* (2013.01); *H04L 5/0064* (2013.01); *H04L 43/16* (2013.01); *H04W 4/70* (2018.02); *H04W 72/042* (2013.01); *H04W 72/0413* (2013.01); *H04W 72/0446* (2013.01); *H04L 1/1812* (2013.01); *H04L 5/0053* (2013.01); *H04L 5/16* (2013.01); *H04W 72/04* (2013.01)

(56) References Cited

U.S. PATENT DOCUMENTS

| | | | | |
|---|---|---|---|---|
| 2010/0074204 A1* | 3/2010 | Meylan | H04L 1/1822 | 370/329 |
| 2010/0322172 A1* | 12/2010 | Hsu | H04L 1/1822 | 370/329 |
| 2012/0099548 A1* | 4/2012 | Yan | H04W 28/18 | 370/329 |
| 2012/0163322 A1* | 6/2012 | Larmo | H04L 1/1854 | 370/329 |
| 2014/0057637 A1* | 2/2014 | Hoang | H04W 56/0045 | 455/445 |
| 2015/0055567 A1* | 2/2015 | Narasimha | H04W 72/1278 | 370/329 |
| 2015/0103749 A1* | 4/2015 | Kela | H04L 5/0055 | 370/329 |
| 2016/0212763 A1* | 7/2016 | Hua | H04W 12/00 | |
| 2016/0227566 A1* | 8/2016 | Bergstrom | H04W 72/1268 | |
| 2016/0278049 A1* | 9/2016 | Nory | H04L 1/1896 | |
| 2017/0127405 A1* | 5/2017 | Agiwal | H04W 72/0413 | |
| 2017/0208581 A1* | 7/2017 | Yang | H04W 72/0413 | |

OTHER PUBLICATIONS

ISA/EP, International Search Report and Written Opinion of the International Searching Authority, Int'l Application No. PCT/US2016/043821, dated Feb. 22, 2017, European Patent Office, Rijswijk, NL, 22 pgs.

LG Electronics, "PDSCH Related Issues for MTC," 3GPP TSG RAN WG1 Meeting #80, R1-150200, Athens, Greece, Feb. 9-13, 2015, 8 pgs, XP050933414, 3rd Generation Partnership Project.

ISA/EPO, Partial International Search Report of the International Searching Authority, Int'l. App. No. PCT/US2016/043821, dated Nov. 17, 2016, European Patent Office, Rijswijk, NL, 7 pgs.

RENESAS Mobile Europe Ltd, "HARQ Procedure for Half Duplex Mode in CC Specific TDD Configuration," 3GPP TSG-RAN WG1 Meeting #67, R1-113887, San Francisco, CA, USA, Nov. 14-18, 2011, 6 pgs., XP050561968, 3rd Generation Partnership Project.

* cited by examiner

MPDCCH

PUSCH

Guard Time

MPDCCH

PUSCH

RETUNE TIME

BUNDLING AND HYBRID AUTOMATIC REPEAT REQUEST OPERATION FOR ENHANCED MACHINE-TYPE COMMUNICATION

CROSS REFERENCES

The present Application for Patent claims priority to U.S. Provisional Patent Application No. 62/198,601 by Rico Alvarino et al., entitled "Bundling and Hybrid Automatic Repeat Request Operation for Enhanced Machine-Type Communication," filed Jul. 29, 2015, assigned to the assignee hereof.

BACKGROUND

The following relates generally to wireless communication, and more specifically to bundling and hybrid automatic repeat request (HARQ) operation for enhanced machine-type communication (MTC).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

A UE may support communication in one direction at a time (e.g., half duplexing) and may be unable to simultaneously transmit and receive. For example, machine-type communications (MTC) devices may support either uplink transmissions or downlink monitoring in a subframe. Furthermore, control information may be communicated using one or more uplink or downlink grants. If a device receives an uplink grant and a downlink grant simultaneously, the device may not be able to transmit and receive using the assigned resources.

SUMMARY

A user equipment (UE), which may be a machine-type communication (MTC) device with a half-duplexing capability, may receive grants for overlapping uplink and downlink resources. The UE may prioritize the grants and, for example, drop the low priority grant or monitor the non-overlapping portion resources assigned by the low priority grant. The UE may determine an acknowledgement mode for downlink transmissions based on one or more grants or on an explicit indication from a base station. A control format indicator may, in some cases, be interpreted based on the grant or on a bundling size of a downlink or uplink channel. In some cases the UE may also identify a retuning time (e.g., for switching between transmit and receive modes or for switching frequencies) and may determine uplink and downlink bundling sizes based on the retuning time.

A method of wireless communication is described. The method may include receiving a first grant for a first set of resources, receiving a second grant for a second set of resources, determining that a portion of the first set of resources overlaps with a portion of the second set of resources, and communicating using the first set of resources or the second set of resources according to a prioritization between the first grant and the second grant.

An apparatus for wireless communication is described. The apparatus may include means for receiving a first grant for a first set of resources, means for receiving a second grant for a second set of resources, means for determining that a portion of the first set of resources overlaps with a portion of the second set of resources, and means for communicating using the first set of resources or the second set of resources according to a prioritization between the first grant and the second grant.

A further apparatus for wireless communication is described. The apparatus may include a processor, memory in electronic communication with the processor, and instructions stored in the memory and operable, when executed by the processor, to cause the apparatus to receive a first grant for a first set of resources, receive a second grant for a second set of resources, determine that a portion of the first set of resources overlaps with a portion of the second set of resources, and communicate using the first set of resources or the second set of resources according to a prioritization between the first grant and the second grant.

A non-transitory computer-readable medium storing code for wireless communication is described. The code may include instructions executable to receive a first grant for a first set of resources, receive a second grant for a second set of resources, determine that a portion of the first set of resources overlaps with a portion of the second set of resources, and communicate using the first set of resources or the second set of resources according to a prioritization between the first grant and the second grant.

Some examples of the method, apparatuses, or non-transitory computer-readable medium described herein may further include processes, features, means, or instructions for dropping the first grant or the second grant based at least in part on the prioritization. Additionally or alternatively, in some examples communicating using the first set of resources or the second set of resources comprises communicating using the first set of resources and a non-overlapped portion of the second set of resources.

In some examples of the method, apparatuses, or non-transitory computer-readable medium described herein, the first and second sets of resources each comprise bundled resources of an uplink channel or a downlink channel.

A method of wireless communication is described. The method may include identifying a retuning time for a UE to switch between a transmitting mode and a receiving mode based at least in part on a half-duplex communication capability of the UE, determining a first bundling size for an uplink data channel and a second bundling size for a downlink control channel based at least in part on the retuning time, and communicating according to the retuning time and the first bundling size or the second bundling size.

An apparatus for wireless communication is described. The apparatus may include means for identifying a retuning time for a UE to switch between a transmitting mode and a receiving mode based at least in part on a half-duplex communication capability of the UE, means for determining a first bundling size for an uplink data channel and a second bundling size for a downlink control channel based at least in part on the retuning time, and means for communicating according to the retuning time and the first bundling size or the second bundling size.

A further apparatus for wireless communication is described. The apparatus may include a processor, memory in electronic communication with the processor, and instructions stored in the memory and operable, when executed by the processor, to cause the apparatus to identify a retuning time for a UE to switch between a transmitting mode and a receiving mode based at least in part on a half-duplex communication capability of the UE, determine a first bundling size for an uplink data channel and a second bundling size for a downlink control channel based at least in part on the retuning time, and communicate according to the retuning time and the first bundling size or the second bundling size.

A non-transitory computer-readable medium storing code for wireless communication is described. The code may include instructions executable to identify a retuning time for a UE to switch between a transmitting mode and a receiving mode based at least in part on a half-duplex communication capability of the UE, determine a first bundling size for an uplink data channel and a second bundling size for a downlink control channel based at least in part on the retuning time, and communicate according to the retuning time and the first bundling size or the second bundling size.

Some examples of the method, apparatuses, or non-transitory computer-readable medium described herein may further include processes, features, means, or instructions for determining for a frequency division duplexing (FDD) configuration that the downlink control channel overlaps with the retuning time, wherein the communicating comprises refraining from decoding the downlink control channel. Additionally or alternatively, in some examples determining the first bundling size comprises reducing the first bundling size or the second bundling size from a nominal bundling size based at least in part on a the retuning time.

Some examples of the method, apparatuses, or non-transitory computer-readable medium described herein may further include processes, features, means, or instructions for determining for a time division duplexing (TDD) whether the uplink data channel and the downlink control channel comprise frequency resources of a same narrowband region. Additionally or alternatively, in some examples the communicating comprises decoding the downlink control channel when the uplink data channel and the downlink control channel comprise frequency resources of the same narrowband region.

In some examples of the method, apparatuses, or non-transitory computer-readable medium described herein, the first bundling size or the second bundling size is based at least in part on whether the uplink data channel and the downlink control channel comprise frequency resources of the same narrowband region. Additionally or alternatively, in some examples a starting time for the downlink control channel is based at least in part on the retuning time and the first bundling size.

A method of wireless communication is described. The method may include receiving a grant for a downlink transmission, and determining an acknowledgement mode for the downlink transmission based at least in part on the grant.

An apparatus for wireless communication is described. The apparatus may include means for receiving a grant for a downlink transmission, and means for determining an acknowledgement mode for the downlink transmission based at least in part on the grant.

A further apparatus for wireless communication is described. The apparatus may include a processor, memory in electronic communication with the processor, and instructions stored in the memory and operable, when executed by the processor, to cause the apparatus to receive a grant for a downlink transmission, and determine an acknowledgement mode for the downlink transmission based at least in part on the grant.

A non-transitory computer-readable medium storing code for wireless communication is described. The code may include instructions executable to receive a grant for a downlink transmission, and determine an acknowledgement mode for the downlink transmission based at least in part on the grant.

In some examples of the method, apparatuses, or non-transitory computer-readable medium described herein, the grant comprises an indication that the acknowledgment mode uses acknowledgement messages for the downlink transmission and an indication of a bundling configuration for the acknowledgment message. Additionally or alternatively, in some examples the grant comprises an indication that the acknowledgment message mode uses acknowledgement messages for the downlink transmission, and wherein a bundling configuration for the acknowledgment message is based at least in part on a bundling configuration for the grant.

In some examples of the method, apparatuses, or non-transitory computer-readable medium described herein, the grant comprises an indication that the acknowledgment mode uses acknowledgement messages for the downlink transmission and an indication of resources for the acknowledgement message. Additionally or alternatively, in some examples the grant comprises an indication that the acknowledgment mode uses acknowledgement messages for the downlink transmission, and wherein resources for the acknowledgement message determined based at least in part on the grant and a bundling size.

A method of wireless communication is described. The method may include determining an acknowledgement message mode for a downlink transmission based at least in part on a channel condition, and transmitting a grant to assign resources for the downlink transmission, wherein the grant comprises an indication of the acknowledgement message mode.

An apparatus for wireless communication is described. The apparatus may include means for determining an acknowledgement message mode for a downlink transmission based at least in part on a channel condition, and means for transmitting a grant to assign resources for the downlink transmission, wherein the grant comprises an indication of the acknowledgement message mode.

A further apparatus for wireless communication is described. The apparatus may include a processor, memory in electronic communication with the processor, and instructions stored in the memory and operable, when executed by the processor, to cause the apparatus to determine an acknowledgement message mode for a downlink transmission based at least in part on a channel condition, and transmit a grant to assign resources for the downlink transmission, wherein the grant comprises an indication of the acknowledgement message mode.

A non-transitory computer-readable medium storing code for wireless communication is described. The code may include instructions executable to determine an acknowledgement message mode for a downlink transmission based at least in part on a channel condition, and transmit a grant to assign resources for the downlink transmission, wherein the grant comprises an indication of the acknowledgement message mode.

In some examples of the method, apparatuses, or non-transitory computer-readable medium described herein, the grant comprises an indication that the acknowledgment mode uses acknowledgement messages for the downlink transmission and a bundling configuration for the acknowledgment message. Additionally or alternatively, in some examples the grant comprises an indication that the acknowledgment mode uses acknowledgement messages for the downlink transmission, and wherein a bundling configuration for the acknowledgment message is based at least in part on a bundling configuration for the grant.

In some examples of the method, apparatuses, or non-transitory computer-readable medium described herein, the grant comprises an indication that the acknowledgment mode uses acknowledgement messages for the downlink transmission and an indication of resources for the acknowledgement message. Additionally or alternatively, in some examples the grant comprises an indication that the acknowledgment mode uses acknowledgement messages for the downlink transmission, and wherein resources for the acknowledgement message are based at least in part on the grant and a bundling size.

A method of wireless communication is described. The method may include determining a bundling configuration for an uplink channel or a downlink channel, receiving a first control format indicator, and communicating according to the first control format indicator based at least in part on the bundling configuration for the uplink channel or the downlink channel.

An apparatus for wireless communication is described. The apparatus may include means for determining a bundling configuration for an uplink channel or a downlink channel, means for receiving a first control format indicator, and means for communicating according to the first control format indicator based at least in part on the bundling configuration for the uplink channel or the downlink channel.

A further apparatus for wireless communication is described. The apparatus may include a processor, memory in electronic communication with the processor, and instructions stored in the memory and operable, when executed by the processor, to cause the apparatus to determine a bundling configuration for an uplink channel or a downlink channel, receive a first control format indicator, and communicate according to the first control format indicator based at least in part on the bundling configuration for the uplink channel or the downlink channel.

A non-transitory computer-readable medium storing code for wireless communication is described. The code may include instructions executable to determine a bundling configuration for an uplink channel or a downlink channel, receive a first control format indicator, and communicate according to the first control format indicator based at least in part on the bundling configuration for the uplink channel or the downlink channel.

Some examples of the method, apparatuses, or non-transitory computer-readable medium described herein may further include processes, features, means, or instructions for receiving a second control format indicator in a downlink grant, wherein the first control format indicator is received in system information or higher layer signaling, and wherein the communicating according to the first control format indicator is based at least in part on the second control format indicator.

A method of wireless communication is described. The method may include determining a bundling configuration for an uplink channel or a downlink channel, transmitting a first control format indicator, and communicating according to the first control format indicator or a second control format indicator based at least in part on the bundling configuration for the uplink channel or the downlink channel.

An apparatus for wireless communication is described. The apparatus may include means for determining a bundling configuration for an uplink channel or a downlink channel, means for transmitting a first control format indicator, and means for communicating according to the first control format indicator or a second control format indicator based at least in part on the bundling configuration for the uplink channel or the downlink channel.

A further apparatus for wireless communication is described. The apparatus may include a processor, memory in electronic communication with the processor, and instructions stored in the memory and operable, when executed by the processor, to cause the apparatus to determine a bundling configuration for an uplink channel or a downlink channel, transmit a first control format indicator, and communicate according to the first control format indicator or a second control format indicator based at least in part on the bundling configuration for the uplink channel or the downlink channel.

A non-transitory computer-readable medium storing code for wireless communication is described. The code may include instructions executable to determine a bundling configuration for an uplink channel or a downlink channel, transmit a first control format indicator, and communicate according to the first control format indicator or a second control format indicator based at least in part on the bundling configuration for the uplink channel or the downlink channel.

Some examples of the method, apparatuses, or non-transitory computer-readable medium described herein may further include processes, features, means, or instructions for transmitting the second control format indicator in a downlink grant, wherein the first control format indicator is transmitted in system information or higher layer signaling.

A method of wireless communication is described. The method may include identifying a downlink bundling configuration and an uplink bundling configuration for a UE, determining a resource configuration for uplink and downlink communications, wherein the resource configuration comprises a first set of resources associated with the downlink bundling configuration interleaved with a second set of resources associated with the uplink bundling configuration, and communicating using the first set of resources or the second set of resources according to the resource configuration.

An apparatus for wireless communication is described. The apparatus may include means for identifying a downlink bundling configuration and an uplink bundling configuration for a UE, means for determining a resource configuration for uplink and downlink communications, wherein the resource configuration comprises a first set of resources associated with the downlink bundling configuration interleaved with a second set of resources associated with the uplink bundling configuration, and means for communicating using the first set of resources or the second set of resources according to the resource configuration.

A further apparatus for wireless communication is described. The apparatus may include a processor, memory in electronic communication with the processor, and instructions stored in the memory and operable, when executed by the processor, to cause the apparatus to identify a downlink bundling configuration and an uplink bundling configuration for a UE, determine a resource configuration for uplink and downlink communications, wherein the resource configuration comprises a first set of resources associated with the downlink bundling configuration interleaved with a second set of resources associated with the uplink bundling configuration, and communicate using the first set of resources or the second set of resources according to the resource configuration.

A non-transitory computer-readable medium storing code for wireless communication is described. The code may include instructions executable to identify a downlink bundling configuration and an uplink bundling configuration for a UE, determine a resource configuration for uplink and downlink communications, wherein the resource configuration comprises a first set of resources associated with the downlink bundling configuration interleaved with a second set of resources associated with the uplink bundling configuration, and communicate using the first set of resources or the second set of resources according to the resource configuration.

A method of wireless communication is described. The method may include communicating using a first set of bundled resources for an uplink data channel, determining that a second set of bundled resources for a downlink control channel comprises an uplink grant with a same hybrid automatic repeat request (HARQ) process identifier as the uplink data channel, an uplink grant with a different hybrid automatic repeat request (HARQ) process identifier than the uplink data channel, or a downlink grant, identifying a time difference between the first set of bundled resources and the second set of bundled resources, and communicating using the second set of bundled resources based at least in part on the determining and the identifying.

An apparatus for wireless communication is described. The apparatus may include means for communicating using a first set of bundled resources of an uplink data channel, means for determining that a second set of bundled resources for a downlink control channel comprises an uplink grant with a same hybrid automatic repeat request (HARQ) process identifier as the uplink data channel, an uplink grant with a different HARQ process identifier than the uplink data channel, or a downlink grant, means for identifying a time difference between the first set of bundled resources and the second set of bundled resources, and means for communicating using the second set of bundled resources based at least in part on the determining and the identifying.

A further apparatus for wireless communication is described. The apparatus may include a processor, memory in electronic communication with the processor, and instructions stored in the memory and operable, when executed by the processor, to cause the apparatus to communicate using a first set of bundled resources of an uplink data channel, determine that a second set of bundled resources for a downlink control channel comprises an uplink grant with a same hybrid automatic repeat request (HARQ) process identifier as the uplink data channel, an uplink grant with a different HARQ process identifier than the uplink data channel, or a downlink grant, identify a time difference between the first set of bundled resources and the second set of bundled resources, and communicate using the second set of bundled resources based at least in part on the determination and the identification.

A non-transitory computer-readable medium storing code for wireless communication is described. The code may include instructions executable to communicate using a first set of bundled resources of an uplink data channel, determine that a second set of bundled resources for a downlink control channel comprises an uplink grant with a same HARQ process identifier as the uplink data channel, an uplink grant with a different HARQ process identifier than the uplink data channel, or a downlink grant, identify a time difference between the first set of bundled resources and the second set of bundled resources, and communicate using the second set of bundled resources based at least in part on the determination and the identification.

In some examples of the method, apparatuses, or non-transitory computer-readable medium described herein, the first set of bundled resources comprises a first bundling size that is less than or equal to a first threshold and the second set of bundled resources comprises a second bundling size that is less than or equal to a second threshold, and wherein the first and second thresholds are known a priori to a user equipment or base station. Additionally or alternatively, in some examples the determination of whether the second set of bundled resources comprises the uplink grant is based at least in part on a periodicity of the second set of bundled resources or a maximum bundle size of the first set of bundled resources.

Some examples of the method, apparatuses, or non-transitory computer-readable medium described herein may further include processes, features, means, or instructions for determining that a third set of bundled resources assigned by a grant in the second set of bundled resources overlaps in time with a fourth set of bundled resources for another downlink control channel, wherein communicating using the second set of bundled resources comprises dropping the grant in the second set of bundled resources. Additionally or alternatively, some examples may include processes, features, means, or instructions for determining that the second set of bundled resources comprises the uplink grant with the same HARQ process identifier as the uplink data channel, wherein communicating using the second set of bundled resources comprises dropping the uplink grant based at least on identifying the time difference.

A method of wireless communication is described. The method may include communicating using a first set of bundled resources for an uplink control channel, determining that a second set of bundled resources for a downlink control channel comprises an uplink grant or a downlink grant based at least in part on a time difference between the first set of bundled resources and the second set of bundled resources, and communicating using the second set of bundled resources based at least in part on the determination.

An apparatus for wireless communication is described. The apparatus may include means for communicating using a first set of bundled resources for an uplink control channel, means for determining that a second set of bundled resources for a downlink control channel comprises an uplink grant or a downlink grant based at least in part on a time difference between the first set of bundled resources and the second set of bundled resources, and means for communicating using the second set of bundled resources based at least in part on the determination.

A further apparatus for wireless communication is described. The apparatus may include a processor, memory in electronic communication with the processor, and instructions stored in the memory and operable, when executed by the processor, to cause the apparatus to communicate using a first set of bundled resources for an uplink control channel, determine that a second set of bundled resources for a downlink control channel comprises an uplink grant or a downlink grant based at least in part on a time difference between the first set of bundled resources and the second set of bundled resources, and communicate using the second set of bundled resources based at least in part on the determination.

A non-transitory computer-readable medium storing code for wireless communication is described. The code may include instructions executable to communicate using a first set of bundled resources for an uplink control channel, determine that a second set of bundled resources for a downlink control channel comprises an uplink grant or a downlink grant based at least in part on a time difference between the first set of bundled resources and the second set of bundled resources, and communicate using the second set of bundled resources based at least in part on the determination.

Some examples of the method, apparatuses, or non-transitory computer-readable medium described herein may further include processes, features, means, or instructions for determining that the second set of bundled resources overlaps in time with the first set of bundled resources, wherein communicating using the second set of bundled resources comprises prioritizing the first set of bundled resources over the second set of bundled resources.

BRIEF DESCRIPTION OF THE DRAWINGS

Aspects of the disclosure are described in reference to the following figures.

DETAILED DESCRIPTION

Figure 1:
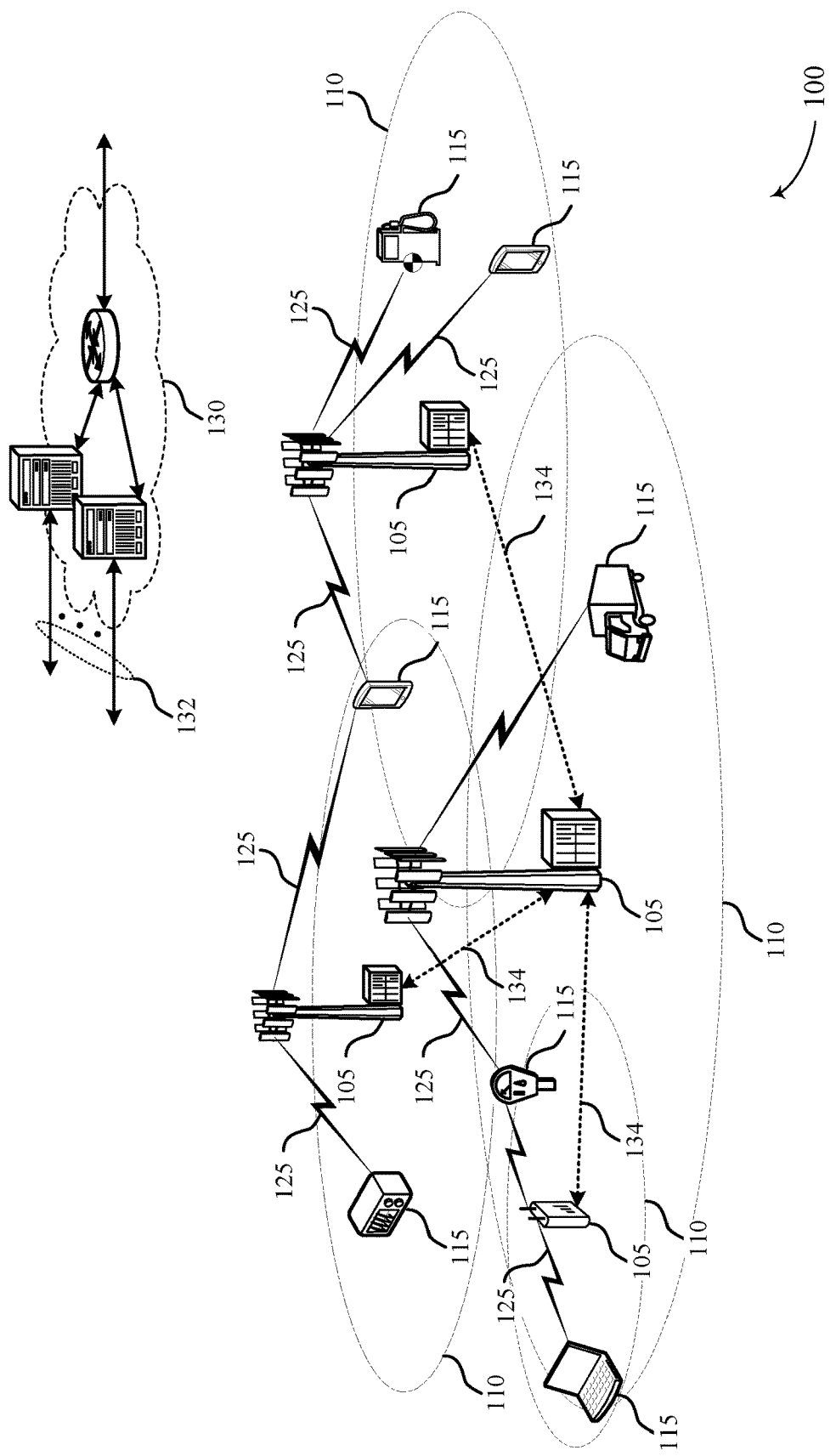
FIG. 1 illustrates an example of a wireless communications system that supports bundling and HARQ operation for enhanced machine-type communication in accordance with various aspects of the present disclosure.

Some wireless systems support data communication technologies that allow devices to communicate with one another or a base station without human intervention. This type of communication may be referred to as machine-type communication (MTC), and systems that include MTC devices may employ techniques to facilitate communication with MTC devices. This may include applying coverage enhancement techniques and scheduling or prioritizing resources assignments to MTC devices to account for the device's capability. Wireless communication systems, including those with MTC devices, may support bundling of uplink and downlink resources in a subframe, which may provide coverage enhancements for some devices. A MTC device, for example, may transmit control signals on the uplink and monitor for control signals on the downlink. Additionally, a system may coordinate hybrid automatic repeat request (HARQ) timing with uplink transmissions and downlink monitoring.

A user equipment (UE), such as an MTC device, may be a low complexity, low cost device—relative to other UEs—and may be characterized by features such as low power operation, duplexing capability (e.g., half-duplexing), and operation in environments with poor radio link conditions. A low complexity UE may be referred to as a category 0 UE, and other, more complex UEs may be different categories of UEs. In some cases, techniques or features employed for the purpose of improving operation of MTC may be referred to as enhanced MTC (eMTC). Some MTC UEs may also be configured to operate using a narrow bandwidth, as compared with bandwidth used by other UEs or as compared with a total available system bandwidth. These MTC UEs may use modified DL control channels such as a MTC physical downlink control channel (MPDCCH).

To support MTC, systems may thus be configured to account for operating characteristics of MTC devices, which may be different from other user equipment (UE). This may include broadcasting certain MTC-specific system information using various repetition levels (e.g., bundling) or transport block sizes. These repetition levels may represent the number of retransmissions that a MTC device may receive before decoding the data.

In some cases, a MTC UE may support half duplexing, and may receive downlink and uplink grants simultaneously. So, as discussed below, priority rules may be established for uplink and downlink grants in these cases. Additionally or alternatively, bundled MPDCCH and HARQ may be monitored in a coordinated fashion. In some examples, timing for UL transmissions, DL monitoring, and HARQ processes may also be coordinated.

A wireless system may also use a Control Format Indicator (CFI) to indicate how many orthogonal frequency division multiplexing (OFDM) symbols are used for carrying control channels (e.g., PDCCH, etc.) during each subframe. CFI may be signaled in a system information message, with higher layer signaling, or with dynamic resource grants. In some cases, a MTC UE may receive multiple CFIs and may select the appropriate one based on a bundling configuration.

In some cases, a base station may schedule transmissions for a MTC UE for downlink and uplink with various bundle sizes. A base station may also establish a switching time between narrowband regions, half-duplex switching, or both. In some cases, various resources or types of communications may be prioritized—for instance, an ongoing transmission may receive higher priority (e.g., PUCCH over M-PDCCH, MPDCCH containing ACK over PUSCH, PDSCH over MPDCCH for a grant, etc.). For unicast messages, and as discussed below, even under early termination, timing may be defined for a nominal bundle by counting from the end of the bundle.

Aspects of the disclosure introduced above are described below in the context of an exemplary wireless communication system. Specific examples are then described for timing configuration consistent with MTC operation. These and other aspects of the disclosure are further illustrated by and described with reference to apparatus diagrams, system diagrams, and flowcharts that relate to bundling operation and hybrid automatic repeat request for enhanced machine-type communication.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communications system 100 may support MTC operations, including timing configurations based on half-duplex operation and transmission bundling.

Base stations 105 may wirelessly communicate with UEs 115 using one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, an MTC device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

As mentioned above, some types of wireless devices may provide for automated communication, including those implementing Machine-to-Machine (M2M) communication or MTC. M2M or MTC may include communications from devices that integrate sensors or meters to measure or capture information and relay that information to a central server or application program that can make use of the information or present the information to users interacting with the program or application. Some UEs 115 may be MTC devices, such as those designed to collect information or enable automated behavior of machines. Examples of applications for MTC devices may include smart metering, inventory monitoring, water level monitoring, equipment monitoring, healthcare monitoring, wildlife monitoring, weather and geological event monitoring, fleet management and tracking, remote security sensing, physical access control, and transaction-based business charging. A MTC device may operate using half-duplex (one-way) communications at a reduced peak rate. MTC devices may also be configured to enter a power saving "deep sleep" mode when not engaging in active communications, during which they may power off some componentry for relatively long periods of time (e.g., tens of milliseconds, hundreds of milliseconds, seconds, minutes, or the like).

Time resources may be organized according to radio frames of length of 10 ms, which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs). In some cases, time intervals in LTE may be expressed in multiples of a basic time unit (e.g., the sampling period, Ts=1/30,720,000 seconds).

A TTI (e.g., 1 ms in LTE, the equivalent of one subframe) may be defined as the smallest unit of time in which a base station 105 may schedule a UE 115 for UL or DL transmission. For example, if a UE 115 is receiving DL data, then during each 1 ms interval a base station 105 may assign resources and indicate (via PDCCH transmissions) to the UE 115 where to look for its DL data. If a transmission is unsuccessful, a UE 115 (or a base station 105) may respond with a negative acknowledgment (NACK) in accordance with a HARQ procedure. In some cases, HARQ procedures may result in multiple retransmissions of data, which may result in delays and an impaired user experience. The degradation in service may be particularly significant in poor radio conditions (e.g., near the edge of a cell). The degradation may not be acceptable for certain time-sensitive user services such as VoIP (or VoLTE). TTI bundling may be used to improve communication link 125 in such radio conditions. TTI bundling may involve sending multiple copies of the same information in a group of consecutive subframes (TTIs) rather than waiting for a NACK before retransmitting redundancy versions as in typical HARQ operation.

HARQ may be a method of ensuring that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor conditions. In other cases, redundancy bits are not added to each transmission, but are retransmitted after the transmitter of the original message receives a negative acknowledgement (NACK) indicating a failed attempt to decode the information. The chain of transmission, response and retransmission may be referred to as a HARQ process. In some cases, a limited number of HARQ processes may be used for a given communication link 125. For MTC devices, HARQ timing combined with bundling and half-duplex operation may impact scheduling and prioritization of transmissions. For example, PDCCH and PUCCH grants may be prioritized by an MTC UE 115.

PDCCH may carry downlink control information (DCI) in control channel elements (CCEs), which may consist of nine logically contiguous resource element groups (REGs), where each REG contains 4 resource elements (REs). DCI includes information regarding downlink (DL) scheduling assignments, uplink (UL) resource grants, transmission scheme, UL power control, HARQ information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system that employs multiple input multiple output (MIMO), the DCI may include additional signaling information. DCI size and format depend on the amount of information as well as factors such as bandwidth, the number of antenna ports, and duplexing mode. PDCCH can carry DCI messages associated with multiple users, and each UE 115 may decode the DCI messages that are intended for it. For example, each UE 115 may be assigned a cell radio network temporary identity (C-RNTI) and CRC bits attached to each DCI may be scrambled based on the C-RNTI.

To reduce power consumption and overhead at the user equipment, a limited set of CCE locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region is monitored by all UEs served by a base station 105 and may include information such as paging information, system information, random access procedures and the like. The UE-specific search space may include user-specific control information. CCEs may be indexed, and the common search space may start from CCE 0. The starting index for a UE specific search space depends on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt to descramble all potential DCI messages using its C-RNTI, and perform a CRC check to determine whether the attempt was successful.

PUCCH may be used for UL acknowledgements (ACKs), scheduling requests (SRs) and channel quality indicators (CQI), and other UL control information. A physical uplink control channel (PUCCH) may be mapped to a control channel defined by a code and two consecutive resource blocks. UL control signaling may depend on the presence of timing synchronization for a cell. PUCCH resources for scheduling request (SR) and channel quality indicator (CQI) reporting may be assigned (and revoked) through radio resource control (RRC) signaling. In some cases, resources for SR may be assigned after acquiring synchronization through a random access channel (RACH) procedure. In other cases, an SR may not be assigned to a UE 115 through the RACH (i.e., synchronized UEs may or may not have a dedicated SR channel). PUCCH resources for SR and CQI may be lost when the UE is no longer synchronized.

Wireless communications system 100 may include a radio link control (RLC) layer that connects higher layers (e.g., RRC and packet data convergence protocol (PDCP)) to the lower layers (e.g., the MAC layer). An RLC entity in a base station 105 or a UE 115 may ensure that transmission packets are organized into appropriately sized blocks (corresponding to the MAC layer transport block size). If an incoming data packet (i.e., a PDCP or RRC service data unit (SDU)) is too big for transmission, the RLC layer may segment it into several smaller RLC protocol data unit (PDUs). If the incoming packets are too small, the RLC layer may concatenate several of them into a single, larger RLC PDU. Each RLC PDU may include a header including information about how to reassemble the data. The RLC layer may also ensure that packets are reliably transmitted. The transmitter may keep a buffer of indexed RLC PDUs, and continue retransmission of each PDU until it receives the corresponding acknowledgement (ACK). In some cases, the transmitter may send a Poll Request to determine which PDU's have been received and the receiver may respond with a Status Report.

Unlike the MAC layer HARQ, RLC automatic repeat request (ARQ) may not include a forward error correction function. A RLC entity may operate in one of three modes. In acknowledged mode (AM), unacknowledged mode (UM) and transparent mode (TM). In AM, the RLC entity may perform segmentation/concatenation and ARQ. This mode may be appropriate for delay tolerant or error sensitive transmissions. In UM, the RLC entity may perform segmentation/concatenation but not ARQ. This may be appropriate for delay sensitive or error tolerant traffic (e.g., voice over Long Term evolution (VoLTE)). TM performs data buffering, and does not include either concatenation/segmentation or ARQ. TM may be used primarily for sending broadcast control information (e.g., the master information block (MIB) and system information block (SIBs)), paging messages, and RRC connection messages. Some transmissions may be sent without RLC (e.g., a RACH preamble and response).

Carriers may transmit bidirectional communications (e.g., using communications links 125) using frequency division duplex (FDD) (e.g., using paired spectrum resources) or time division duplex (TDD) operation (e.g., using unpaired spectrum resources). Frame structures for FDD (e.g., frame structure type 1) and TDD (e.g., frame structure type 2) may be defined. For TDD frame structures, each subframe may carry UL or DL traffic, and special subframes may be used to switch between DL and UL transmission. Allocation of UL and DL subframes within radio frames may be symmetric or asymmetric and may be statically determined or may be reconfigured semi-statically. Special subframes may carry DL or UL traffic and may include a Guard Period (GP) between DL and UL traffic. Switching from UL to DL traffic may be achieved by setting a timing advance at the UE 115 without the use of special subframes or a guard period. UL-DL configurations with switch-point periodicity equal to the frame period (e.g., 10 ms) or half of the frame period (e.g., 5 ms) may also be supported. For example, TDD frames may include one or more special frames, and the period between special frames may determine the TDD DL-to-UL switch-point periodicity for the frame.

Use of TDD may offer flexible deployments without paired UL-DL spectrum resources. In some TDD network deployments, interference may be caused between UL and DL communications (e.g., interference between UL and DL communication from different base stations, interference between UL and DL communications from base stations and UEs, etc.). For example, where different base stations 105 serve different UEs 115 within overlapping coverage areas according to different TDD UL-DL configurations, a UE 115 attempting to receive and decode a DL transmission from a serving base station 105 can experience interference from UL transmissions from other, proximately located UEs 115.

A UE 115, such as a half-duplex capable MTC device, may receive grants for overlapping uplink and downlink resources. The UE 115 may then prioritize the grants and either drop or, in some cases, monitor the non-overlapping portion of the low priority channel associated with a grant. The UE 115 may also determine an acknowledgement mode for the downlink transmission based on one or more grants or on an explicit indication from a base station 105. A control format indicator (CFI) may also be interpreted based on the grant or on the bundling size. In some cases, the UE 115 may also identify a retuning time and may determine uplink and downlink bundling sizes accordingly.

Figure 2:
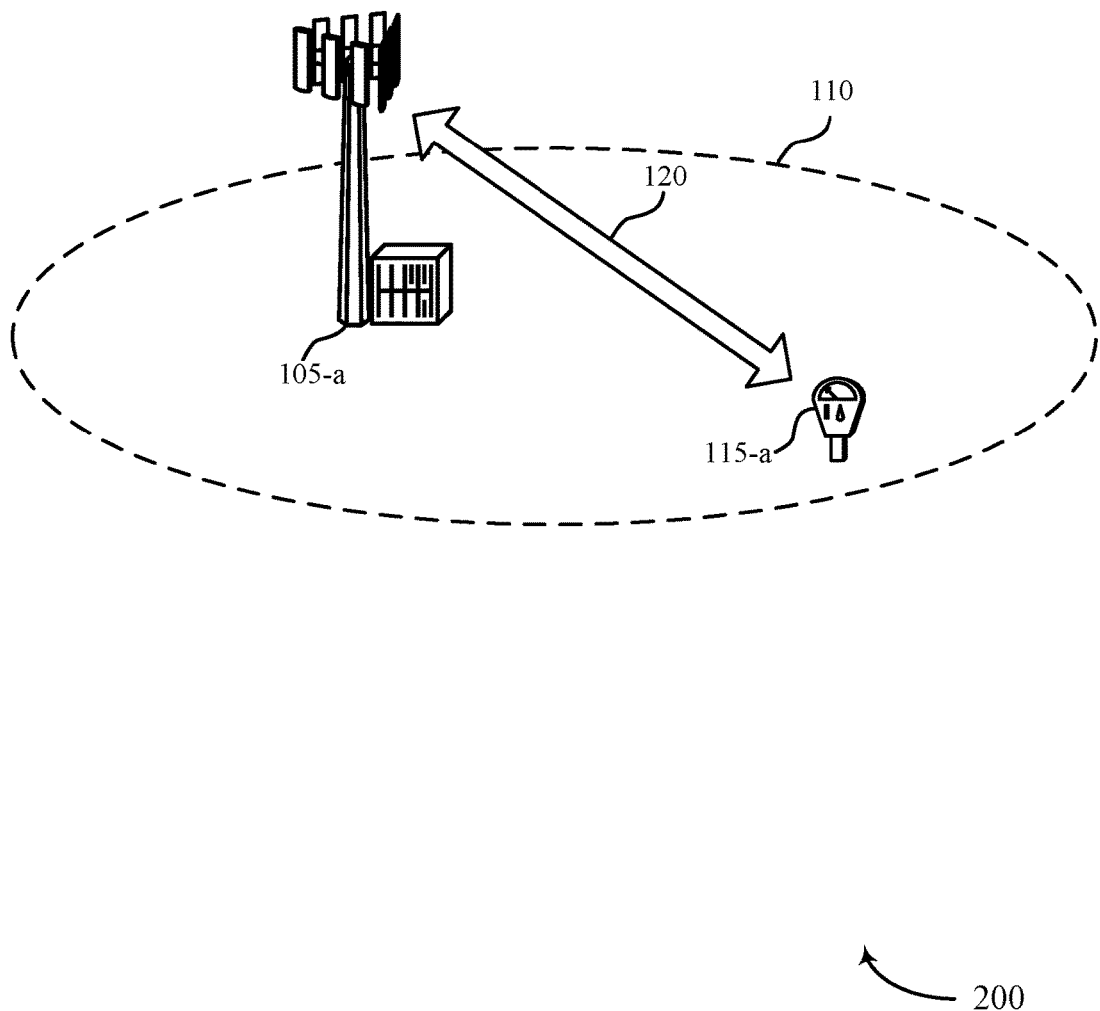
FIG. 2 illustrates an example of a wireless communications system that supports bundling and HARQ operation for enhanced machine-type communication in accordance with various aspects of the present disclosure.

FIG. 2 illustrates an example of a wireless communications system 200 for bundling operation and hybrid automatic repeat request for enhanced machine-type communication in accordance with various aspects of the present disclosure. Wireless communications system 200 may include a UE 115-a and a base station 105-a, which may be examples of a UE 115 and base station 105 described with reference to FIG. 1. Wireless communications system 200 may support MTC operations, including timing configurations based on half-duplex operation and transmission bundling.

Wireless communications system 200 may support MTC operations to enable operation of low cost and low complexity devices. For example, in the context of LTE systems, these low cost UEs or MTC UEs 115 may be referred to as category 0 UEs, which may be characterized by reduced peak data rates (e.g., a possible maximum of 1000 bits for a transport block size), rank one transmission, one receive antenna, and, if half-duplex, relaxed switching timing (from transmission to reception or vice versa) from, for example, 20 µs for regular UEs to 1 ms for MTC UEs. These MTC UEs 115 may monitor DL control channels in a manner similar to other UEs 115, including PDCCH and MTC PDCCH (MPDCCH).

Additional MTC enhancements (referred to as eMTC in some cases) may be supported as well. For example, narrowband operation may be supported, such that MTC UE 115-a may be able to operate in a wider system bandwidth. The system 200 may support operation in multiple system bandwidth ranges (e.g., 1.4/3/5/10/15/20 MHz) using 1.4 MHz or 6 RBs, as described above. Additionally, wireless communications systems may support coverage enhancements up to 15 dB.

MTC UE 115-a may support half duplexing (HD) where communication is possible in two directions (e.g., uplink and downlink) but in one direction at a time (e.g., uplink or downlink). Frequency Division Duplexing (FDD) HD, for instance, supports transmission and reception of signals in one direction at a time using two different frequencies. Time Division Duplexing (TDD) HD may support transmitting a short amount of data in separate timeslots, in one direction at a time. MTC UE 115-a may support FDD HD and TDD HD for communication with base station 105-a.

Wireless communications system 200 may also support or employ a common search space where Control Channel Elements (CCEs) are allocated and used for communicating control information for a group of UEs. Information on the CCE aggregation level and the number of repetition for data transmission may be fixed in the specification or configured by the network. In some cases, a subset of these resources may be semi-statically configured for constructing a UE-specific search space for MPDCCH by higher-layer signaling. In these cases, UE-specific CCEs can be decoded by a specific UE (e.g., UE 115-a), and a predetermined number of repetitions may be specified for the UE. Also, a starting subframe of an M-PDCCH UE-specific search space may be configured for enhanced coverage.

Wireless communications system 200, in some examples, may support a frame and subframe structure in which a frame includes 10 subframes. MTC UE 115-a may monitor for messages from base station 105-a in a set of subframes of a frame, and may transmit messages to base station 105-a in another set of subframes of the same frame, a different frame, or both. In some cases, MTC UE 115-a may support half duplexing, and may receive downlink and uplink grants simultaneously. In these cases, priority rules may be established for the uplink and downlink grants. Additionally, in some cases, bundled MPDCCH monitoring is combined with HARQ monitoring, and timing for UL transmissions, DL monitoring, and HARQ processes are coordinated.

By way of example, for FDD HD, if uplink and downlink are bundled, then PUSCH and PDSCH assignments may overlap in time. For example, MTC UE 115-a may receive a downlink grant, indicated to begin at subframe N, and an uplink grant, indicated to begin at subframe N+4, both with a bundle size of 8. This type of operation may be unsupported in HD mode. Alternatively, if the bundle size for DL is small (e.g., 2), there may be time to retune to uplink and base station 105-a may transmit both grants in the same subframe.

For FDD with long bundle sizes, base station 105-a may be configured to not transmit both grants in the same subframe. For example, if aggregation level 24 is monitored, base station 105-a may send one grant. For TDD with long bundle sizes, transmission of UL messages and reception of DL messages may be combined. Additionally, if MTC UE 115-a receives both DL and UL grants that overlap, it may be appropriate to signal rules for MTC UE 115-a. In some cases, one of the grants may be dropped (e.g., keep DL, drop UL), and, in other cases, one grant or may receive priority (e.g., finish the UL transmission before monitoring for DL messages).

MTC UE 115-a may transmit an uplink message and then monitor for downlink messages using, for example, MPDCCH. In these cases, the system 200 may account for time between UL transmission and DL monitoring for MTC UE 115-a to retune (e.g., 1ms for FDD and 1-3 symbols for TDD) aspects of its RF chain. Alternatively, for FDD HD, MTC UE 115-a may be configured to not monitor MPDCCH when there is insufficient time to retune. Also, MTC UE 115-a may use a shortened bundle size for either PUSCH or MPDCCH to allow time to retune.

For TDD, MTC UE 115-a may monitor MPDCCH when in the same narrowband as PUSCH. If narrowband allocations for DL and UL are different, MTC UE 115-a may discard the MPDCCH grant. Additionally, MTC UE 115-a may monitor for a full format if the same narrowband is used, and a shortened format if a different narrowband is used. For example, a shortened format may include a subframe with 3 control symbols for retuning. In some cases, the full format may include the signaled number of control symbols. Base station 105-a may also be configured to schedule MPDCCH and PUSCH grants so as to allow time for retuning between transmissions and monitoring.

The transmission of PUCCH for HARQ feedback may reduce the downlink data rate. In some cases, the reduction in downlink data rate may be significant. MTC UE 115-a may thus rely on MAC processes instead of HARQ processes when there is low or an acceptably low likelihood of error in a communication system. In some cases, a bundle size for PUCCH may be signaled to MTC UE 115-a. Base station 105-a may indicate, e.g., in a DL grant, whether MTC UE 115-a should send an ACK/NAK. If an ACK/NAK is requested, base station 105-a may indicate the repetition length for the PUCCH. Alternatively, the bundling length of PUCCH may be included with MPDCCH or the corresponding PDSCH transmission, whose bundling length may be dynamic. Also, the PUCCH resource may be implicitly or explicitly signaled. For example, MTC UE 115-a may be configured with 4 PUCCH resources, each one with a different bundle size. As such, the DL grant may include 2 bits to select one of these resources.

Wireless communications system 200 may support a CFI used to indicate how many OFDM symbols (e.g., control symbols) are used for carrying control channels (e.g., PDCCH, etc.) at each subframe. MTC UE 115-a may determine that those symbols carrying control channels are unusable for the MTC UE 115-a—e.g., because the control symbols use a wide frequency band, while the MTE UE 115-a is capable of narrowband operation. MTC UE 115-a may thus refrain from monitoring during symbols signaled or indicated to contain PDCCH.

The number of control symbols may be signaled by system information (e.g., SIB1) or higher layer signaling (e.g., RRC signaling). For example, a cell may signal 2 control symbols if the cell is configured to or otherwise supports use of one or two control symbols. When one control symbol is used, OFDM symbol may be wasted if a UE 115 expects that additional control symbols include control information. So, in some cases, if a cell signals CFI=1, then there may be less flexibility for base station 105-a to include more control symbols, but also there may be fewer unused resources.

In some cases, system 200, through base station 105-a, may coordinate resources and grants for MTC UE 115-a based on the CFI. In some examples, an MTC UE 115-a with a large bundle size may follow the signaled CFI. Base station 105-a may signal the CFI in a downlink grant for UE 115-a in normal coverage. For example, system information block 1 (SIB1) may contain CFI=3, but DCI may contain the true CFI (e.g., CFI=1). In some cases, MPDCCH may be decoded based on the CFI signaled in SIB1. In such cases, the corresponding PDSCH may use the CFI signaled in the grant. Additionally, CFI may be signaled in a grant, but may not depend on the value in SIB1. For example, if SIB1 signals CFI=1, DCI may not include CFI so the minimum value may be 1. Also, the signaling may be 1 bit, and the final CFI value may depend on the SIB1 value. For example, if SIB1=1 then there may be no signaling in DCI, if SIB1=2 then DCI may select between 1 and 2, and if SIB1=3 then DCI may select between 2 and 3.

By way of example, for TDD, simultaneous bundled uplink and downlink channels may be supported (e.g., transmitting PUSCH and monitoring MPDCCH simultaneously). Additionally or alternatively, system 200 and base station 105-a or MTC UE 115-a may employ rules for reducing the number of subframes used when monitoring MPDCCH. For example, if a PUSCH transmission is ongoing, and decoding MPDCCH grant schedules PUSCH that overlaps in time with ongoing PUSCH, then the MPDCCH grant may be discarded. Further, base station 105-a may be configured to avoid sending UL grants for PUSCH that may overlap with current PUSCH transmission.

In FDD configurations, the time between uplink scheduling may not, without additional coordination by system 200, correspond with HARQ timing. For example, the starting MPDCCH subframe may be every 10 subframes, the MPDCCH bundle size may be 6, and the PUSCH bundle size may be 9. So the time between PUSCH transmission and MPDCCH monitoring may not correspond to HARQ timing.

If uplink scheduling does not correspond with HARQ timing, the starting subframe for MPDCCH may allow for HARQ timing, for example. Additionally, MPDCCH may be monitored in cases when HARQ timing may not be met. Alternatively, if no ACK is transmitted (e.g., grant-based HARQ), the MPDCCH starting at a subframe before the end of the HARQ process may not schedule the same HARQ process. For asynchronous HARQ processes, MTC UE 115-a may receive a grant with the same HARQ ID as the previous transmission. In these cases, it may be appropriate to prune out the grant, or follow the grant.

In some examples, for downlink, after PDSCH reception, MTC UE 115-a may transmit PUCCH. In such cases, the next MPDCCH may not meet HARQ timing after the PUCCH transmission. If the second monitoring instant (e.g., MPDCCH) is right after PUCCH, base station 105-a may not have time to process PUCCH to decide on the MPDCCH grant. In such cases, it may be appropriate to count from the end of the bundle to ensure sufficient processing time. Further, MTC UE 115-a may be configured to not schedule the same HARQ process from an MPDCCH. However, if MTC UE 115-a schedules the same HARQ process from the MPDCCH, MTC UE 115-a may either follow or discard the grant. In such cases, base station 105-a may reuse the same HARQ process.

In some cases, such as for some downlink communications, MTC UE 115-a may monitor MPDCCH every 10 subframes. If an MPDCCH schedules PDSCH, it may overlap with PUCCH of the previous PDSCH. Further, if the MPDCCH schedules PUSCH, it may also overlap with PUCCH of the previous PDSCH. In these cases, the PUCCH transmission may be given priority. MTC UE 115-a may drop any assignment that may overlap with PUCCH (e.g., half duplex FDD MTC UE 115-a).

Thus, base station 105-a may schedule transmissions for MTC UE 115-a for DL and UL with various bundle sizes. Also, base station 105-a may establish a switching time between narrowband regions, half duplex switching, or both. In some cases, for HARQ processes performed over MPDCCH in a first monitoring instant, the ACK/NAK message may be transmitted in the next monitoring instant. Further, an ongoing transmission may receive higher priority (e.g., PUCCH over M-PDCCH, MPDCCH containing ACK over PUSCH, PDSCH over MPDCCH for a grant, etc.). For unicast messages, including those under early termination, the timing may be defined for a nominal bundle by counting from the end of the bundle. For example, if MTC UE 115-a is able to decode PDSCH in 4 subframes, and the bundle size is 8, the HARQ timing and application of rules may be done by assuming 8 subframes.

FIGS. 3A, 3B, 3C, 3D and 3E illustrate example bundling and HARQ operation timing schemes 300-a, 300-b, 300-c, 300-d, and 300-e that support uplink transmissions and downlink monitoring for MTC in accordance with various aspects of the present disclosure. Timing schemes 300-a, 300-b, 300-c, 300-d, and 300-e may be based on a bundling scheme for a MTC device consistent with HARQ timing and control channel scheduling and may illustrate methods to avoid overlapping of uplink and downlink processes.

Figure 3A:
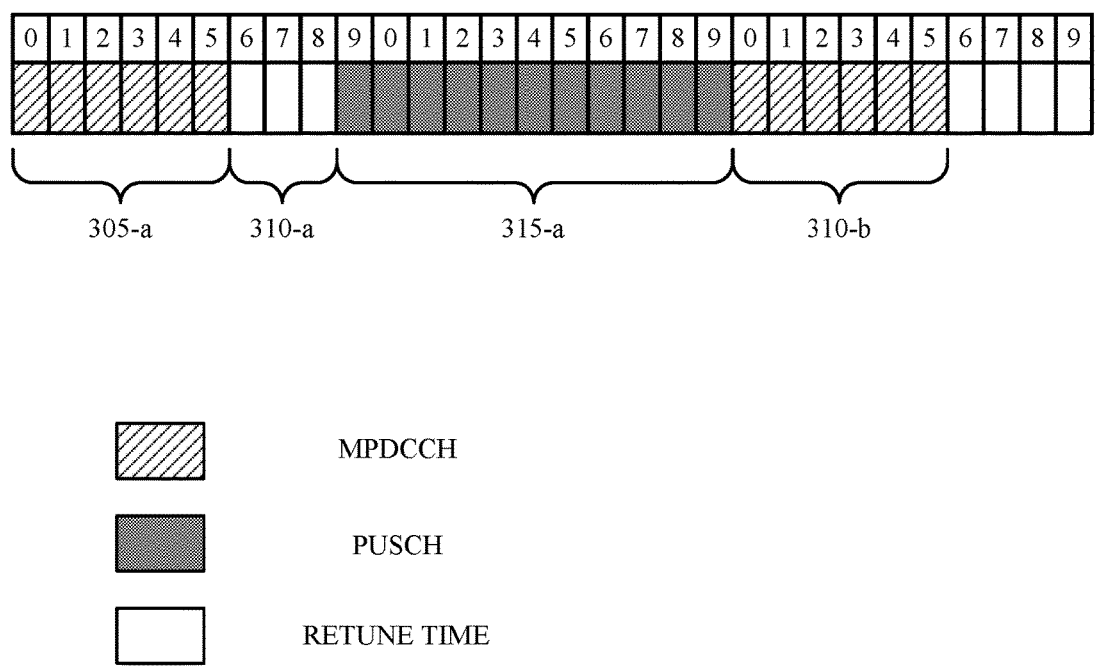
FIGS. 3A, 3B, 3C, 3D, and 3E illustrate example bundling and HARQ operation for enhanced machine-type communication in accordance with various aspects of the present disclosure.

As depicted in FIG. 3A, timing scheme 300-a may represent back-to-back transmission of downlink and uplink channels for MTC. During MPDCCH period 305-a, a device may monitor MPDCCH in a first set of subframes. Additionally, a device may identify a scheduled gap 310-a to switch between a transmitting mode and a receiving mode based on a half-duplex communication capability. The device may receive a first grant for a set of resources (e.g., at PUSCH period 315-*a*), and may have to monitor a second set of resources (e.g., during MPDCCH period 310-*b*). In some cases, the device may determine that a portion of the first set of resources overlaps with a portion of the second set of resources or with the scheduled gap 310-*a*. Additionally, the device may determine that the second set of resources is contiguous to the first set of resources, so the device may not have time to retune from a transmitting mode to a receiving mode. In some cases, the device may determine a first bundling size for PUSCH period 315-*a*, and may determine a second bundling size for MPDCCH period 310-*b* based on the retuning time. The device may then communicate according to the retuning time and the first bundling size or the second bundling size.

Thus, the device may communicate using the first set of resources or the second set of resources according to a prioritization between the first grant and the second grant. This prioritization may include dropping the first grant or the second grant. The device may also communicate using the first set of resources and a non-overlapped portion of the second set of resources. For example, the UE might communicate using the whole of the first set of resources, but a subset of the second set of resources (e.g. by monitoring subframes 1-5 in 310-*b*). The first and second sets of resources may include bundled resources of an uplink channel or a downlink channel.

In some cases, a device may determine that MPDCCH overlaps with the retuning time for a frequency division duplexing (FDD) configuration. As such, the device may refrain from decoding an MPDCCH. In some cases, the first bundling size or the second bundling size may be reduced from a nominal bundling size based on the retuning time.

The device may also determine whether PUSCH period 315-*a* and MPDCCH period 310-*b* include scheduled resources with frequencies in the same narrowband region. In some examples, MPDCCH may be decoded when PUSCH and MPDCCH include frequency resources of the same narrowband region. In some cases, the first bundling size or the second bundling size may be based on whether PUSCH and MPDCCH include frequency resources of the same narrowband region. Additionally, a starting time for MPDCCH may be based on the retuning time and the first bundling size.

Figure 3B:
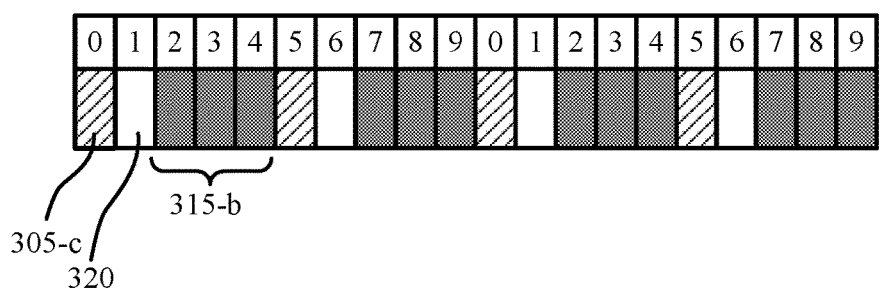
Figure 3B:
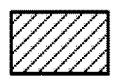
Figure 3B:
Figure 3B:

Timing scheme 300-*b* of FIG. 3B may represent interleaved uplink and downlink bundling for a device. The device may identify a downlink bundling configuration and an uplink bundling configuration. The device may then determine a resource configuration for uplink and downlink communications. In some cases, the resource configuration may include a first set of resources associated with the downlink bundling configuration (e.g., at MPDCCH periods 305-*c*) interleaved with a second set of resources associated with the uplink bundling configuration, (e.g., at PUSCH periods 315-*b*). The device may then communicate using the first set of resources or the second set of resources according to the resource configuration. In some cases, the MPDCCH monitoring and the PUSCH transmissions may be separated by a guard band 320.

Additionally, the device may determine a bundling configuration for an uplink channel or a downlink channel. The device may receive a first CFI, and communicate according to the first CFI based on the bundling configuration for PUSCH periods 315-*c* or MPDCCH periods 305-*d* and 305-*e*. The device may receive a second CFI in a downlink grant, and may receive the first CFI in system information or higher layer signaling. In such cases, the device may communicate according to the first CFI based on the second CFI.

Figure 3C:
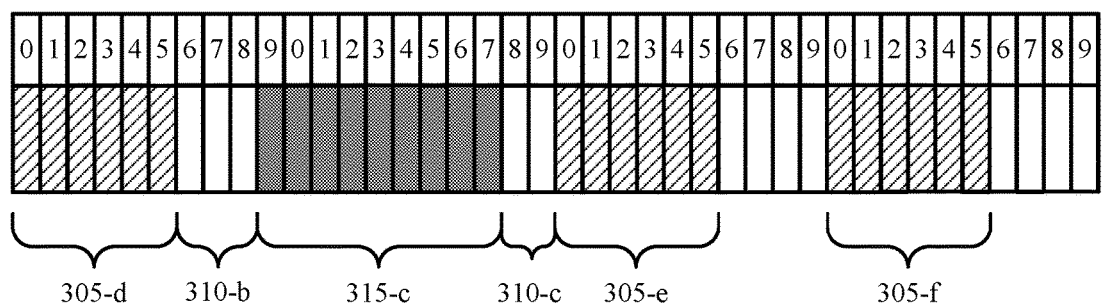
Figure 3C:
Figure 3C:
Figure 3C:

Timing scheme 300-*c* of FIG. 3C may represent uplink and downlink scheduling where HARQ timing may be uncoordinated with MPDCCH monitoring and PUSCH transmissions. A device may receive a grant for a downlink transmission during MPDCCH period 305-*d* and may determine an acknowledgement mode for the downlink transmission based on the grant. In some cases, the grant includes an indication that the acknowledgement mode uses acknowledgement messages for MPDCCH period 305-*d*, and an indication of a bundling configuration for the acknowledgement message.

In some examples, for FDD, the starting MPDCCH subframe may be every 10 subframes (e.g., between MPDCCH period 305-*d* and MPDCCH period 305-*e*), and at scheduled gap 310-*c* the time between PUSCH periods 315-*c* and MPDCCH period 305-*e* may not correspond to HARQ timing. If uplink scheduling does not correspond with HARQ timing, the starting subframe for MPDCCH period 305-*e* may be modified to allow for HARQ timing. For example, if the MPDCCH bundle size is 2 and the maximum PUSCH bundle size is 10, the total timing may be 2 (from MPDCCH)+3 (from retuning/scheduling timing)+10 (from PUSCH)+3 (for HARQ timing), and the MPDCCH period may be greater than 18 subframes (not shown). In other cases, a device may support different MPDCCH monitoring subframes for uplink and downlink. In some examples, if the MPDCCH bundle size is 2 and the maximum PUSCH bundle size is 10, the total timing for an uplink cycle may be greater than 18 subframes, and the total timing for a downlink cycle may be 10 subframes (e.g., 2 (MPDCCH)+2 (PDSCH)+3 (HARQ timing)+3 (PUCCH)). Accordingly, the device may monitor MPDCCH for downlink every 10 ms and MPDCCH for uplink every 20 ms.

Additionally, a device may monitor MPDCCH in cases when HARQ timing may not be met. For example, at scheduled gap 310-*c*, the time between PUSCH period 315-*c* (e.g., starting at subframe N) and MPDCCH period 305-*e* (e.g., starting at subframe N+K) may be less than HARQ timing (e.g., $K < K_{HARQ}$). In such cases, if an explicit ACK is expected for PUSCH 315-*c*, it may be transmitted at MPDCCH period 305-*f* (in the next monitoring instant). Further, if MPDCCH period 305-*e* contains a PDSCH assignment that overlaps with MPDCCH period 305-*f*, the device may ignore the assignment. In some cases, a base station may be configured to refrain from simultaneous transmission of MPDCCH and unassociated PDSCH.

Alternatively, if no ACK is transmitted (e.g., grant-based HARQ), the MPDCCH period 305-*e* may not schedule the same HARQ process. For asynchronous HARQ processes, a device may receive a grant with the same HARQ ID as the previous transmission. In such cases, it may be appropriate to prune out or follow the grant. As for synchronous HARQ processes, MPDCCH period 305-*d* may schedule a different HARQ process (e.g., for at least 2 HARQ processes).

This bundling configuration for the acknowledgement message may be based on a bundling configuration for the grant. Additionally, the grant may include an indication of resources for an acknowledgement messages. In some cases, the time between PUSCH period 315-*c* and MPDCCH period 305-*e* at scheduled gap 310-*c* may not be coordinated with HARQ timing. As such, the resources for the acknowledgement message may be determined based on the grant and a bundling size.

In other cases, a scheduling device may determine an acknowledgement mode for a downlink transmission based on a channel condition, and transmit a grant to assign resources for the downlink transmission (i.e., MPDCCH)

that includes an indication of the acknowledgement mode. The grant may also include an indication that the acknowledgement mode uses acknowledgement messages for the downlink transmission, and a bundling configuration for the acknowledgement message.

The bundling configuration for the acknowledgement message may be based on a bundling configuration for the grant. The grant may also include an indication of resources for an acknowledgement message. In some examples, the resources for the acknowledgement may be based on the grant and bundling size.

Figure 3D:
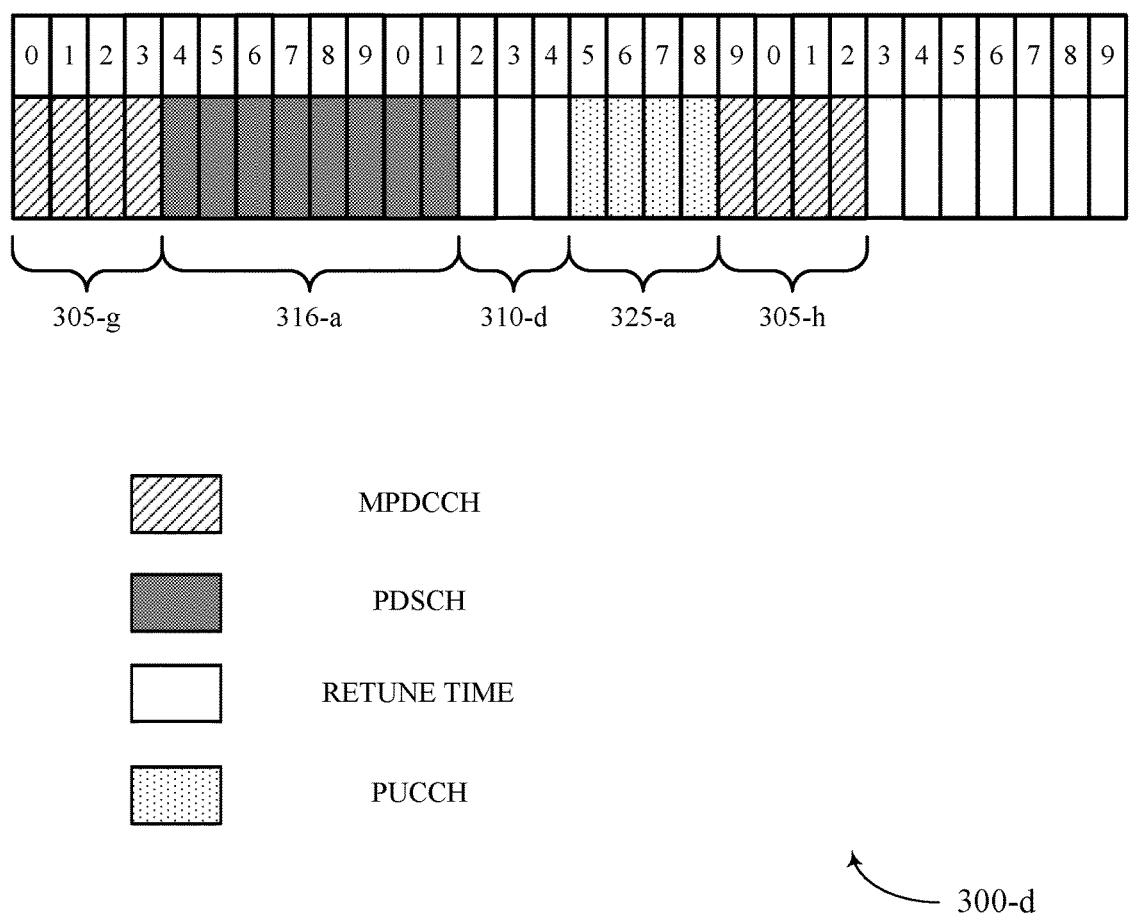

Timing scheme 300-d of FIG. 3D may represent uplink and downlink scheduling where a set of resources used to transmit PUCCH may overlap with or be contiguous to a set of resources used to monitor MPDCCH. At PDSCH period 316-a, a device may communicate using a first set of bundled resources for PDSCH. The device may determine that a second set of bundled resources for MPDCCH period 305-g includes an uplink grant with a same HARQ process identifier as PDSCH, an uplink grant with a different HARQ process identifier than PDSCH, or a downlink grant based on a time difference between the first set of bundled resources and the second set of bundled resources. The device may then communicate using the second set of bundled resources based on the determination.

In some examples, for downlink, after PDSCH reception, an MTC may transmit PUCCH at 325-a. In such cases, the MPDCCH period 305-h may not meet HARQ timing after the PUCCH transmission. For example, the starting subframe may be every 10 subframes, the bundle size may be 4 for MPDCCH periods 305-g and 305-h, the bundle size may be 8 for PDSCH period 316-a, and the PUCCH period 325-a bundle size (e.g., used to send ACK) may be 4. If the second monitoring instant at MPDCCH period 305-h is right after PUCCH period 325-a, a base station 105 may not have time to process PUCCH to decide on the MPDCCH grant. In such cases, it may be appropriate to count from the end of the bundle to ensure sufficient processing time. Further, a MTC may be configured to refrain from scheduling the same HARQ process from MPDCCH period 305-g. However, if a device schedules the same HARQ process from MPDCCH period 305-g, the device may either follow or discard the grant. In such cases, a base station may reuse the same HARQ process.

A device may determine that a third set of bundled resources assigned by a grant in the second set of bundled resources at PUCCH period 325-a overlaps in time with a fourth set of bundled resources for MPDCCH period 305-h. In such cases, the device may drop the grant in the second set of bundled resources. Additionally, the device may determine that the second set of bundled resources includes the uplink grant with the same HARQ process identifier as a PDSCH. As such, the device may drop the uplink grant.

Figure 3E:
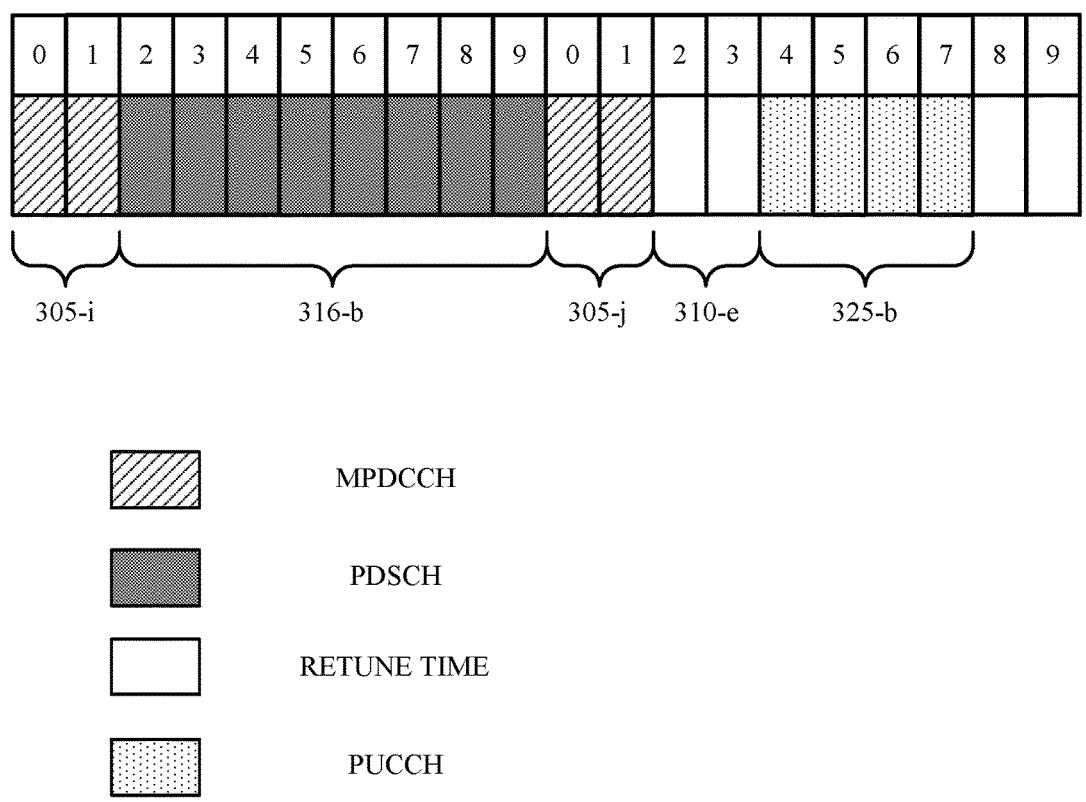

Timing scheme 300-e of FIG. 3E may represent uplink and downlink scheduling where a device may monitor MPDCCH using separate sets of subframes. At PUCCH period 325-b, a device may communicate using a first set of bundled resources for PUCCH. The device may determine that a second set of resources for MPDCCH period 305-j includes an uplink grant or a downlink grant based on a time difference between the first set of bundled resources and the second set of bundled resources. This uplink grant indicates the communication over a third set of resources (not shown in Figure), e.g. to transmit PUSCH or to receive PDSCH. In some cases, the device may determine that the second set of bundled resources overlaps in time with the first set of bundled resources at PUCCH period 325-b (or a scheduled gap 310-e), and may prioritize the first set of bundled resources over the second set of bundled resources.

In some examples, a device may monitor MPDCCH every 10 subframes. For example, if MPDCCH period 305-i schedules PUSCH, it may overlap with PUCCH period 325-b of the previous PDSCH. Further, if MPDCCH period 305-i or 305-j schedules PUSCH (not shown), it may also overlap with PUCCH period 325-b of the previous PDSCH. In such cases, PUCCH period 325-b may be given priority. The device may drop any assignment that may overlap with PUCCH period 325-b (e.g., half duplex FDD).

In some cases, a first set of bundled resources may include a first bundling size that is less than or equal to a first threshold, and the second set of resources includes a second bundling size that is less than or equal to a second threshold. In some cases, the first and second thresholds may be known a priori to the device or a base station. Additionally, the determination of whether the second set of bundled resources includes the uplink grant may be based on a periodicity of the second set of bundled resources or a maximum bundle size of the first set of bundled resources.

Figure 4:
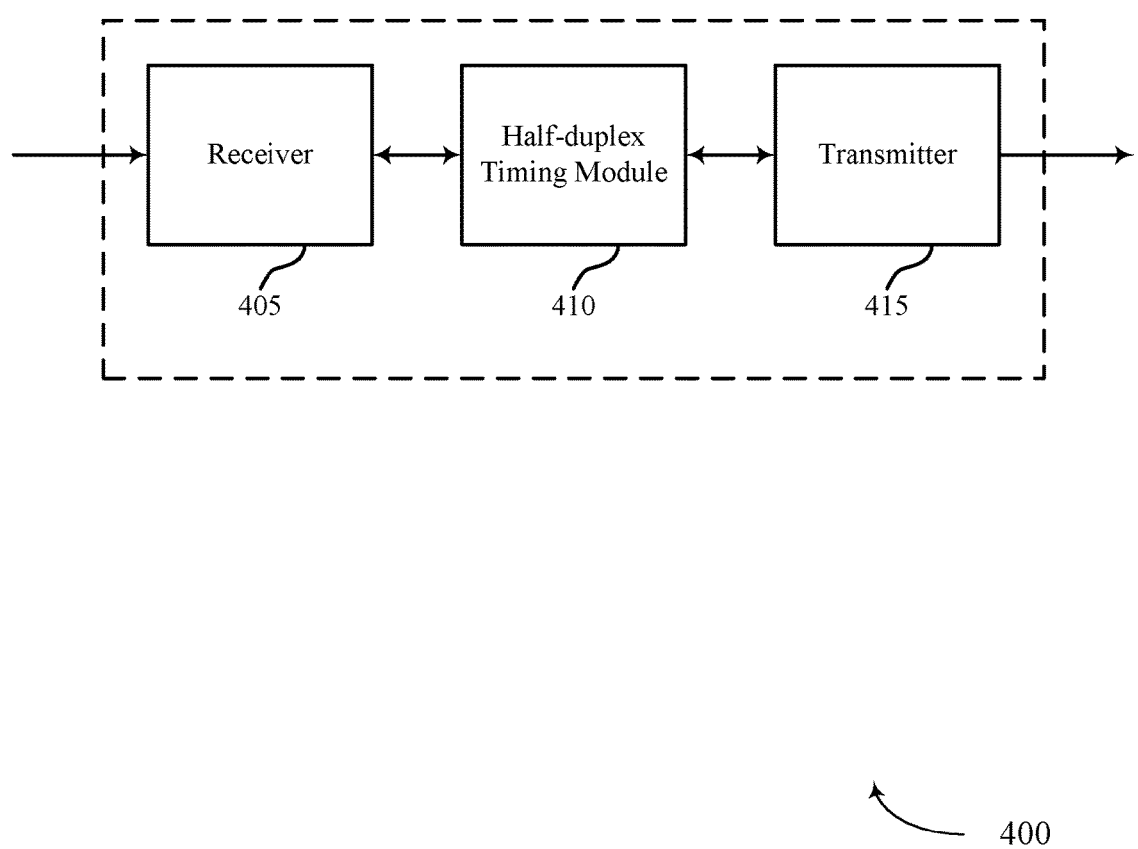
FIGS. 4-6 show block diagrams of a wireless device or devices that support bundling and HARQ operation for enhanced machine-type communication in accordance with various aspects of the present disclosure.

FIG. 4 shows a block diagram of a wireless device 400 that supports bundling and HARQ operation for enhanced machine-type communication in accordance with various aspects of the present disclosure. Wireless device 400 may be an example of aspects of a UE 115 described with reference to FIGS. 1-3. Wireless device 400 may include a receiver 405, a half-duplex timing module 410, or a transmitter 415. Wireless device 400 may also include a processor. Each of these components may be in communication with one another.

The receiver 405 may receive information such as packets, user data, or control information associated with various information channels (e.g., control channels, data channels, and information related to bundling operation and hybrid automatic repeat request for enhanced machine-type communication, etc.). Information may be passed on to the half-duplex timing module 410, and to other components of wireless device 400.

The half-duplex timing module 410, in combination with receiver 405 for instance, may receive a first grant for a first set of resources, receive a second grant for a second set of resources, determine that a portion of the first set of resources overlaps with a portion of the second set of resources, and communicate using the first set of resources or the second set of resources according to a prioritization between the first grant and the second grant.

The transmitter 415 may transmit signals received from other components of wireless device 400. In some examples, the transmitter 415 may be collocated with the receiver 405 in a transceiver module. The transmitter 415 may include a single antenna, or it may include a plurality of antennas.

Figure 5:
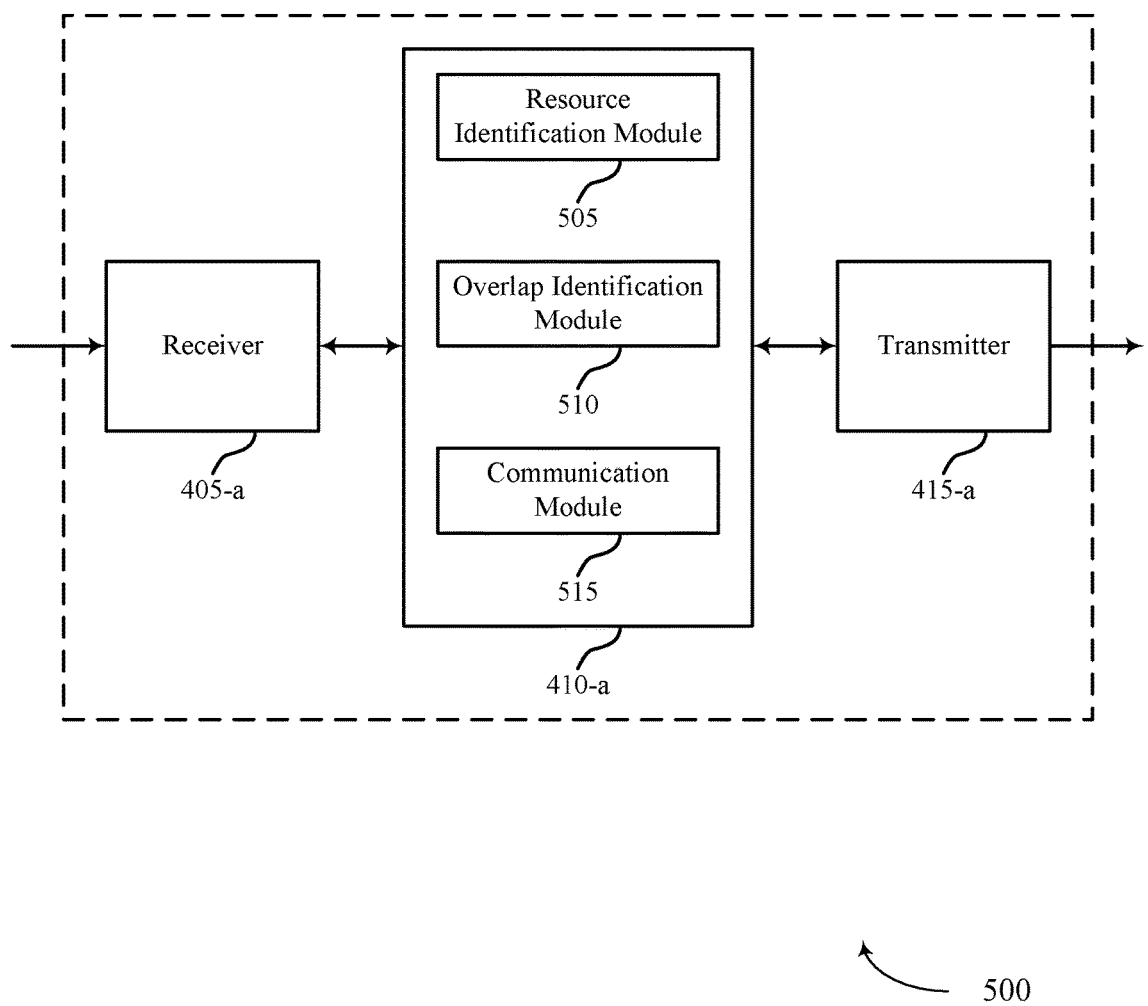

FIG. 5 shows a block diagram of a wireless device 500 that supports bundling and HARQ operation for enhanced machine-type communication in accordance with various aspects of the present disclosure. Wireless device 500 may be an example of aspects of a wireless device 400 or a UE 115 described with reference to FIGS. 1-4. Wireless device 500 may include a receiver 405-a, a half-duplex timing module 410-a, or a transmitter 415-a. Wireless device 500 may also include a processor. Each of these components may be in communication with one another. The half-duplex timing module 410-a may also include a resource identification module 505, an overlap identification module 510, and a communication module 515.

The receiver 405-a may receive information which may be passed on to half-duplex timing module 410-a, and to other components of wireless device 500. The half-duplex timing module 410-*a* may perform the operations described with reference to FIG. 4. The transmitter 415-*a* may transmit signals received from other components of wireless device 500.

The resource identification module 505 may, in combination with receiver 405-*a*, receive various signals. The resource identification module 505 may receive a first grant for a first set of resources as described with reference to FIGS. 2-3. The resource identification module 505 may also receive a second grant for a second set of resources. The resource identification module 505 may, in some cases, drop the first grant or the second grant based on the prioritization. In some examples, the first and second sets of resources each includes bundled resources of an uplink channel or a downlink channel. The resource identification module 505 may also determine for a TDD configuration whether the uplink data channel and the downlink control channel includes frequency resources of a same narrowband region.

The resource identification module 505 may also receive a grant for a downlink transmission. The resource identification module 505 may, in combination with transmitter 415-*a* for instance, transmit a grant to assign resources for the downlink transmission including an indication of the acknowledgement mode. The resource identification module 505 may also determine a resource configuration for uplink and downlink communications including a first set of resources associated with the downlink bundling configuration interleaved with a second set of resources associated with the uplink bundling configuration. The resource identification module 505 may also determine that a second set of bundled resources for a downlink control channel includes an uplink grant with a same HARQ process identifier as the uplink data channel, an uplink grant with a different HARQ process identifier than the uplink data channel, or a downlink grant based on a time difference between the first set of bundled resources and the second set of bundled resources.

In some examples, the first set of bundled resources includes a first bundling size that is less than or equal to a first threshold and the second set of bundled resources includes a second bundling size that is less than or equal to a second threshold. In some cases, the first and second thresholds are known a priori to a user equipment or base station. In some examples, the determination of whether the second set of bundled resources includes the uplink grant may be based on a periodicity of the second set of bundled resources or a maximum bundle size of the first set of bundled resources. The resource identification module 505 may also determine that a third set of bundled resources assigned by a grant in the second set of bundled resources overlaps in time with a fourth set of bundled resources for another downlink control channel, where communicating using the second set of bundled resources includes dropping the grant in the second set of bundled resources.

The resource identification module 505 may also determine that the second set of bundled resources includes the uplink grant with the same HARQ process identifier as the uplink data channel, where communicating using the second set of bundled resources includes dropping the uplink grant. The resource identification module 505 may also determine that a second set of bundled resources for a downlink control channel includes an uplink grant or a downlink grant based on a time difference between the first set of bundled resources and the second set of bundled resources.

The overlap identification module 510 may determine that a portion of the first set of resources overlaps with a portion of the second set of resources as described with reference to FIGS. 2-3. The overlap identification module 510 may also determine for a frequency division duplexing (FDD) configuration that the downlink control channel overlaps with the retuning time, where the communicating includes refraining from decoding the downlink control channel. The overlap identification module 510 may also determine that the second set of bundled resources overlaps in time with the first set of bundled resources, where communicating using the second set of bundled resources includes prioritizing the first set of bundled resources over the second set of bundled resources.

The communication module 515 may, in combination with receiver 405-*a* or transmitter 415-*a*, or both, communicate using the first set of resources or the second set of resources according to a prioritization between the first grant and the second grant as described with reference to FIGS. 2-3. In some examples, communicating using the first set of resources or the second set of resources includes communicating using the first set of resources and a non-overlapped portion of the second set of resources. The communication module 515 may also communicate according to the retuning time and the first bundling size or the second bundling size. In some examples, the communicating includes decoding the downlink control channel when the uplink data channel and the downlink control channel includes frequency resources of the same narrowband region. The communication module 515 may also communicate according to the first control format indicator based on the bundling configuration for the uplink channel or the downlink channel.

The communication module 515 may communicate according to the first control format indicator or a second control format indicator based on the bundling configuration for the uplink channel or the downlink channel. The communication module 515 may also communicate using the first set of resources or the second set of resources according to the resource configuration. The communication module 515 may also communicate using a first set of bundled resources for an uplink data channel. The communication module 515 may also communicate using the second set of bundled resources based on the determination. The communication module 515 may also communicate using a first set of bundled resources for an uplink control channel. In some cases, the communication module 515 communicates using the second set of bundled resources based on the determination.

Figure 6:
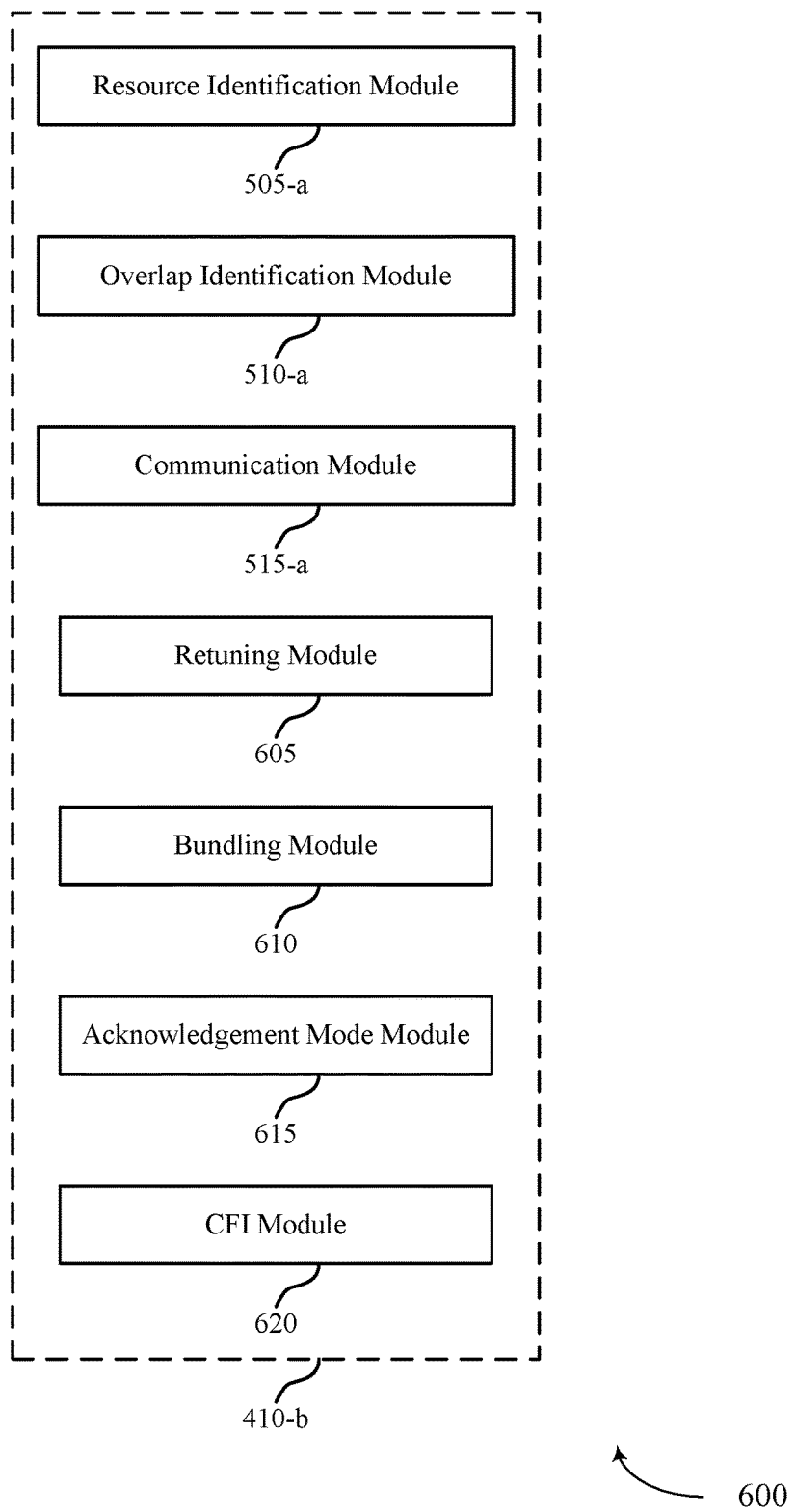

FIG. 6 shows a block diagram 600 of a half-duplex timing module 410-*b* which may be a component of a wireless device 400 or a wireless device 500 that supports bundling and HARQ operation for enhanced machine-type communication in accordance with various aspects of the present disclosure. The half-duplex timing module 410-*b* may be an example of aspects of a half-duplex timing module 410 described with reference to FIGS. 4-5. The half-duplex timing module 410-*b* may include a resource identification module 505-*a*, an overlap identification module 510-*a*, and a communication module 515-*a*. Each of these modules may perform the functions described with reference to FIG. 5. The half-duplex timing module 410-*b* may also include a retuning module 605, a bundling module 610, an acknowledgement mode module 615, and a channel format indicator (CFI) module 620.

The retuning module 605 may identify a retuning time for a UE to switch between a transmitting mode and a receiving mode based on a half-duplex communication capability of the UE as described with reference to FIGS. 2-3. In some examples, a starting time for the downlink control channel may be based on the retuning time and the first bundling size.

The bundling module 610 may determine a first bundling size for an uplink data channel and a second bundling size for a downlink control channel based on the retuning time as described with reference to FIGS. 2-3. In some examples, determining the first bundling size includes reducing the first bundling size or the second bundling size from a nominal bundling size based on a the retuning time. In some examples, the first bundling size or the second bundling size may be based on whether the uplink data channel and the downlink control channel includes frequency resources of the same narrowband region. The bundling module 610 may also determine a bundling configuration for an uplink channel or a downlink channel. The bundling module 610 may also determine a bundling configuration for an uplink channel or a downlink channel. The bundling module 610 may also identify a downlink bundling configuration and an uplink bundling configuration for a UE.

The acknowledgement mode module 615 may determine an acknowledgement mode for the downlink transmission based on the grant as described with reference to FIGS. 2-3. In some examples, the grant includes an indication that the acknowledgement mode uses acknowledgement messages for the downlink transmission and an indication of a bundling configuration for an acknowledgement message. In some examples, the grant includes an indication that the acknowledgement mode uses acknowledgement messages for the downlink transmission, and where a bundling configuration for the acknowledgement message may be based on a bundling configuration for the grant. In some examples, the grant includes an indication that the acknowledgement mode uses acknowledgement messages for the downlink transmission and an indication of resources for an acknowledgement message. In some examples, the grant includes an indication that the acknowledgement mode uses acknowledgement messages for the downlink transmission, and resources for an acknowledgement message may be determined based on the grant and a bundling size. The acknowledgement mode module 615 may also determine an acknowledgement mode for a downlink transmission based on a channel condition. In some examples, the grant includes an indication that the acknowledgement mode uses acknowledgement messages for the downlink transmission and a bundling configuration for an acknowledgement message.

In some examples, the grant includes an indication that the acknowledgement mode uses acknowledgement messages for the downlink transmission, and a bundling configuration for the acknowledgement message may be based on a bundling configuration for the grant. In some examples, the grant includes an indication that the acknowledgement mode uses acknowledgement messages for the downlink transmission and an indication of resources for an acknowledgement message. In some examples, the grant includes an indication that the acknowledgement mode uses acknowledgement messages for the downlink transmission; resources for an acknowledgement message may be based on the grant and a bundling size.

The CFI module 620 may receive a first control format indicator as described with reference to FIGS. 2-3. The CFI module 620 may also receive a second control format indicator in a downlink grant, where the first control format indicator is received in system information or higher layer signaling, and where the communicating according to the first control format indicator is based on the second control format indicator. The CFI module 620 may also transmit a first CFI. The CFI module 620 may also transmit the second CFI in a downlink grant, and the first control format indicator may be transmitted in system information or higher layer signaling.

The components of wireless device 400, wireless device 500, and half-duplex timing module 410 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 7:
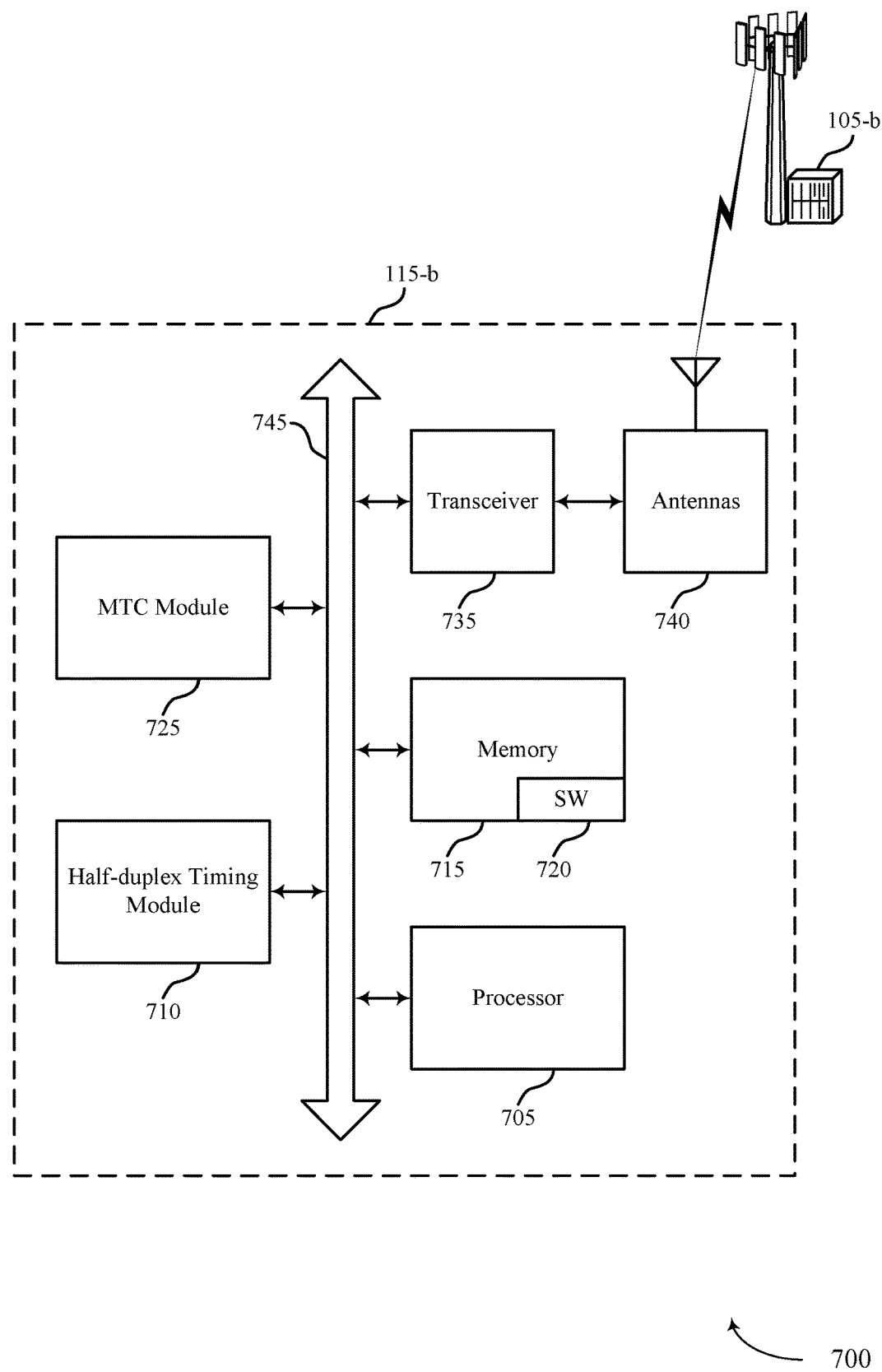
FIG. 7 illustrates a block diagram of a system, including a wireless device that supports bundling and HARQ operation for enhanced machine-type communication in accordance with various aspects of the present disclosure.

FIG. 7 shows a diagram of a system 700, including a UE that supports bundling and HARQ operation for enhanced machine-type communication in accordance with various aspects of the present disclosure. System 700 may include UE 115-*b*, which may be an example of a wireless device 400, a wireless device 500, or a UE 115 described with reference to FIGS. 1, 2 and 4-6. UE 115-*b* may include a half-duplex timing module 710, which may be an example of a half-duplex timing module 410 described with reference to FIGS. 4-6. UE 115-*b* may also include an MTC module 725 which may enable MTC operations such as half-duplex and narrowband communication. UE 115-*b* may also include components for bi-directional voice and data communications including components for transmitting communications and components for receiving communications.

UE 115-*b* may also include a processor 705, and memory 715 (including software (SW) 720), a transceiver 735, and one or more antenna(s) 740, each of which may communicate, directly or indirectly, with one another (e.g., via buses 745). The transceiver 735 may communicate bi-directionally, via the antenna(s) 740 or wired or wireless links, with one or more networks, as described above. For example, the transceiver 735 may communicate bi-directionally with a base station 105 or another UE 115. The transceiver 735 may include a modem to modulate the packets and provide the modulated packets to the antenna(s) 740 for transmission, and to demodulate packets received from the antenna(s) 740. While UE 115-*b* may include a single antenna 740, UE 115-*b* may also have multiple antennas 740 capable of concurrently transmitting or receiving multiple wireless transmissions.

The memory 715 may include random access memory (RAM) and read only memory (ROM). The memory 715 may store computer-readable, computer-executable software/firmware code 720 including instructions that, when executed, cause the processor 705 to perform various functions described herein (e.g., bundling operation and hybrid automatic repeat request for enhanced machine-type communication, etc.). Alternatively, the software/firmware code 720 may not be directly executable by the processor 705 but cause a computer (e.g., when compiled and executed) to perform functions described herein. The processor 705 may include an intelligent hardware device, (e.g., a central processing unit (CPU), a microcontroller, an application specific integrated circuit (ASIC), etc.)

Figure 8:
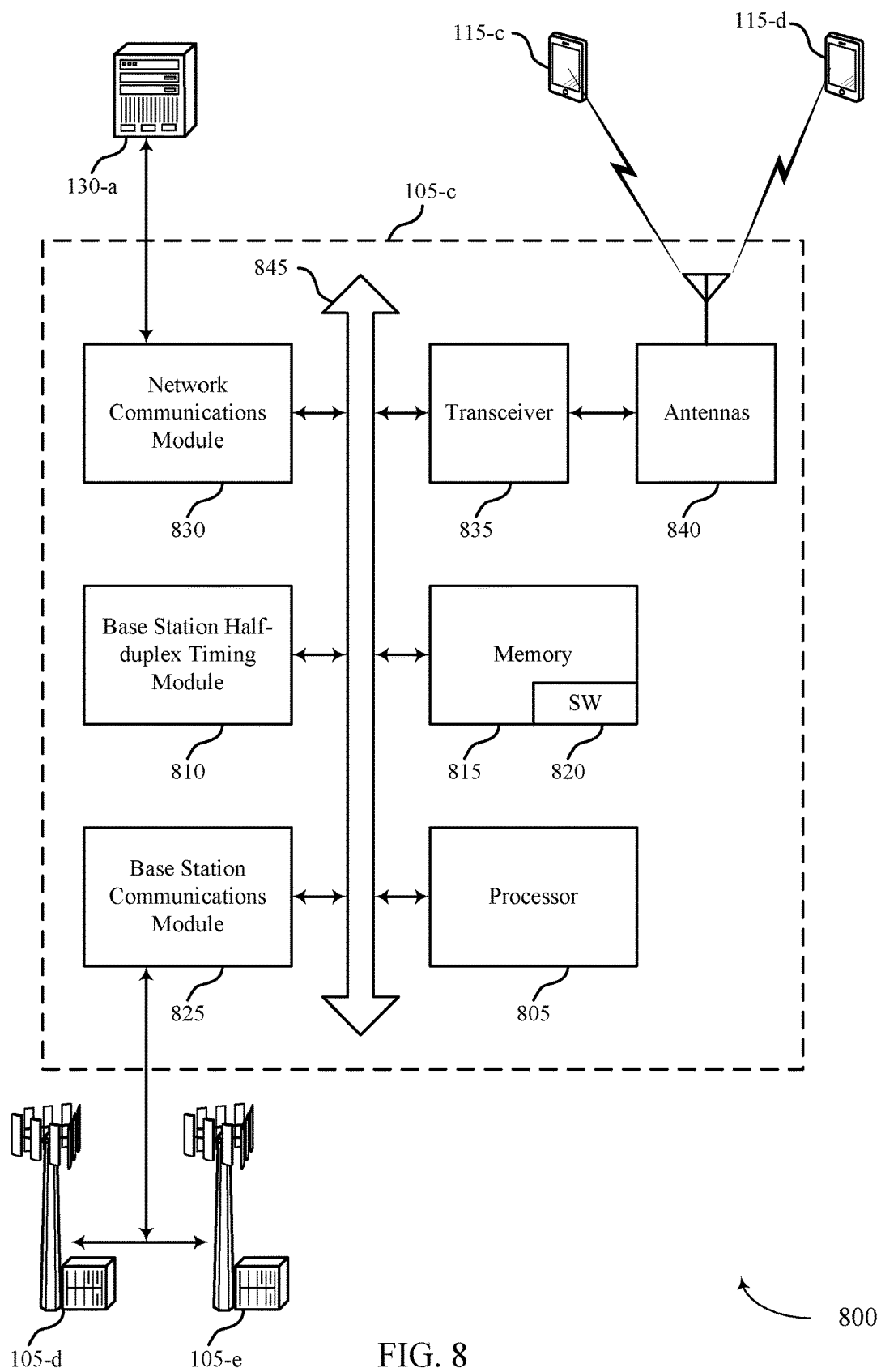
FIG. 8 illustrates a block diagram of a system, including a base station that supports bundling and HARQ operation for enhanced machine-type communication in accordance with various aspects of the present disclosure.

FIG. 8 shows a diagram of a system 800, including a base station 105 that supports bundling and HARQ operation for enhanced machine-type communication in accordance with various aspects of the present disclosure. System 800 may include base station 105-c, which may be an example of a wireless device 400, a wireless device 500, or a base station 105 described with reference to FIGS. 1, 2 and 5-7. Base Station 105-c may include a base station half-duplex timing module 810, which may be an example of a base station half-duplex timing module 810 described with reference to FIGS. 5-7. Base Station 105-c may also include components for bi-directional voice and data communications including components for transmitting communications and components for receiving communications. For example, base station 105-c may communicate bi-directionally with UE 115-c or UE 115-d.

In some cases, base station 105-c may have one or more wired backhaul links. Base station 105-c may have a wired backhaul link (e.g., S1 interface, etc.) to the core network 130. Base station 105-c may also communicate with other base stations 105, such as base station 105-d and base station 105-e via inter-base station backhaul links (e.g., an X2 interface). Each of the base stations 105 may communicate with UEs 115 using the same or different wireless communications technologies. In some cases, base station 105-c may communicate with other base stations such as 105-d or 105-e utilizing base station communication module 825. In some examples, base station communication module 825 may provide an X2 interface within a Long Term Evolution (LTE)/LTE-A wireless communication network technology to provide communication between some of the base stations 105. In some examples, base station 105-c may communicate with other base stations through core network 130. In some cases, base station 105-c may communicate with the core network 130 through network communications module 830.

The base station 105-c may include a processor 805, memory 815 (including software (SW) 820), transceiver 835, and antenna(s) 840, which each may be in communication, directly or indirectly, with one another (e.g., over bus system 845). The transceivers 835 may be configured to communicate bi-directionally, via the antenna(s) 840, with the UEs 115, which may be multi-mode devices. The transceiver 835 (or other components of the base station 105-c) may also be configured to communicate bi-directionally, via the antennas 840, with one or more other base stations (not shown). The transceiver 835 may include a modem configured to modulate the packets and provide the modulated packets to the antennas 840 for transmission, and to demodulate packets received from the antennas 840. The base station 105-c may include multiple transceivers 835, each with one or more associated antennas 840. The transceiver may be an example of a combined receiver 405 and transmitter 415 of FIG. 4.

The memory 815 may include RAM and ROM. The memory 815 may also store computer-readable, computer-executable software code 820 containing instructions that are configured to, when executed, cause the processor 805 to perform various functions described herein (e.g., bundling operation and hybrid automatic repeat request for enhanced machine-type communication, selecting coverage enhancement techniques, call processing, database management, message routing, etc.). Alternatively, the software 820 may not be directly executable by the processor 805 but be configured to cause the computer, e.g., when compiled and executed, to perform functions described herein. The processor 805 may include an intelligent hardware device, e.g., a CPU, a microcontroller, an ASIC, etc. The processor 805 may include various special purpose processors such as encoders, queue processing modules, base band processors, radio head controllers, digital signal processor (DSPs), and the like.

The base station communications module 825 may manage communications with other base stations 105. In some cases, a communications management module may include a controller or scheduler for controlling communications with UEs 115 in cooperation with other base stations 105. For example, the base station communications module 825 may coordinate scheduling for transmissions to UEs 115 for various interference mitigation techniques such as beamforming or joint transmission.

Figure 9:
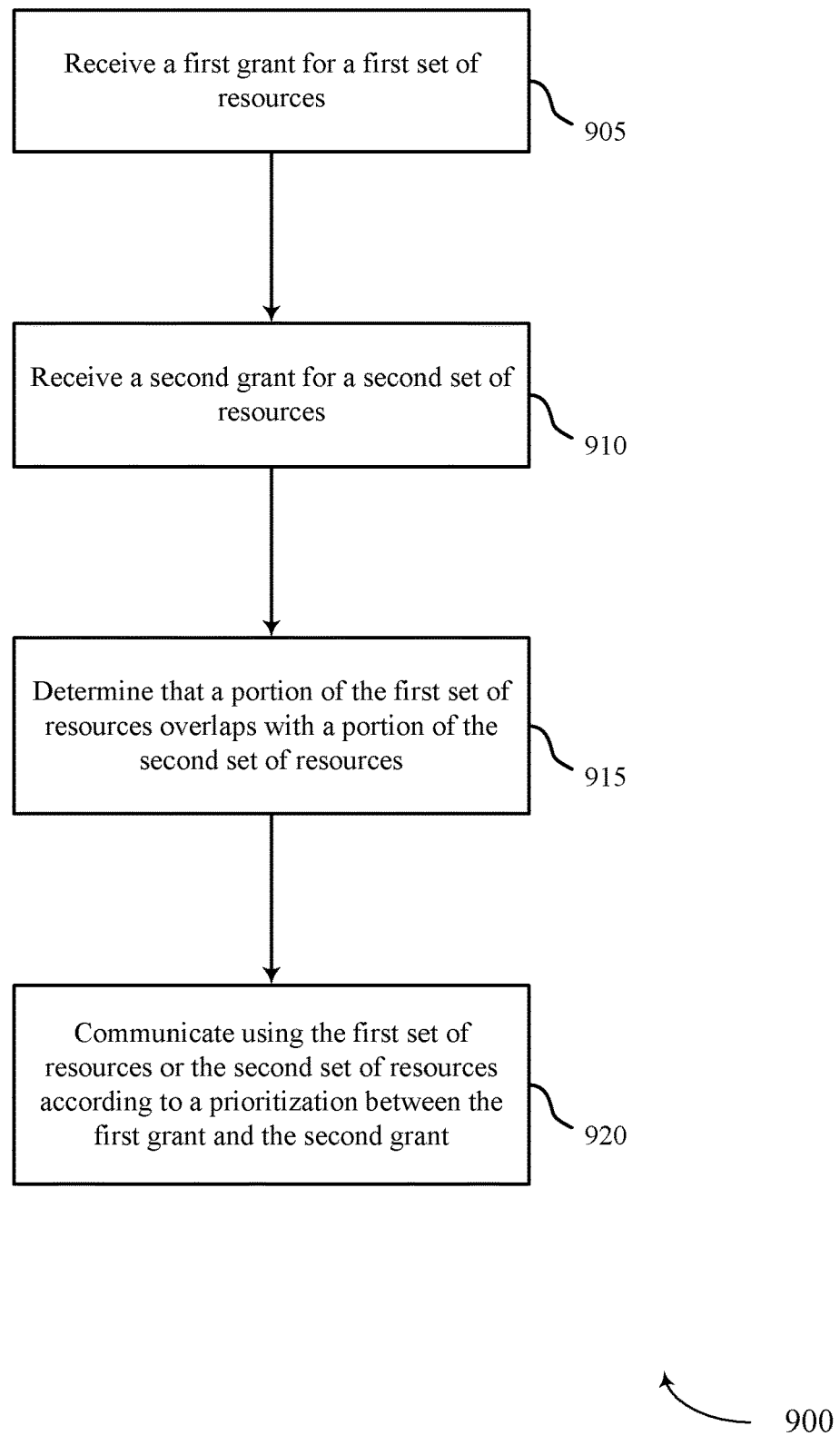
FIGS. 9-19 illustrate methods for bundling or HARQ operation, or both, for enhanced machine-type communication in accordance with various aspects of the present disclosure.

FIG. 9 shows a flowchart illustrating a method 900 for bundling or HARQ operation, or both, for enhanced machine-type communication in accordance with various aspects of the present disclosure. The operations of method 900 may be implemented by a UE 115 or its components as described with reference to FIGS. 1-8. For example, the operations of method 900 may be performed by the half-duplex timing module 410 as described with reference to FIGS. 4-7. In some examples, a UE 115 may execute a set of codes to control the functional elements of the UE 115 to perform the functions described below. Additionally or alternatively, the UE 115 may perform aspects the functions described below using special-purpose hardware.

At block 905, the UE 115 may receive a first grant for a first set of resources as described with reference to FIGS. 2-3. In certain examples, the operations of block 905 may be performed by the resource identification module 505 as described with reference to FIG. 5.

At block 910, the UE 115 may receive a second grant for a second set of resources as described with reference to FIGS. 2-3. In certain examples, the operations of block 910 may be performed by the resource identification module 505 as described with reference to FIG. 5.

At block 915, the UE 115 may determine that a portion of the first set of resources overlaps with a portion of the second set of resources as described with reference to FIGS. 2-3. In certain examples, the operations of block 915 may be performed by the overlap identification module 510 as described with reference to FIG. 5.

At block 920, the UE 115 may communicate using the first set of resources or the second set of resources according to a prioritization between the first grant and the second grant as described with reference to FIGS. 2-3. In certain examples, the operations of block 920 may be performed by the communication module 515 as described with reference to FIG. 5.

Figure 10:
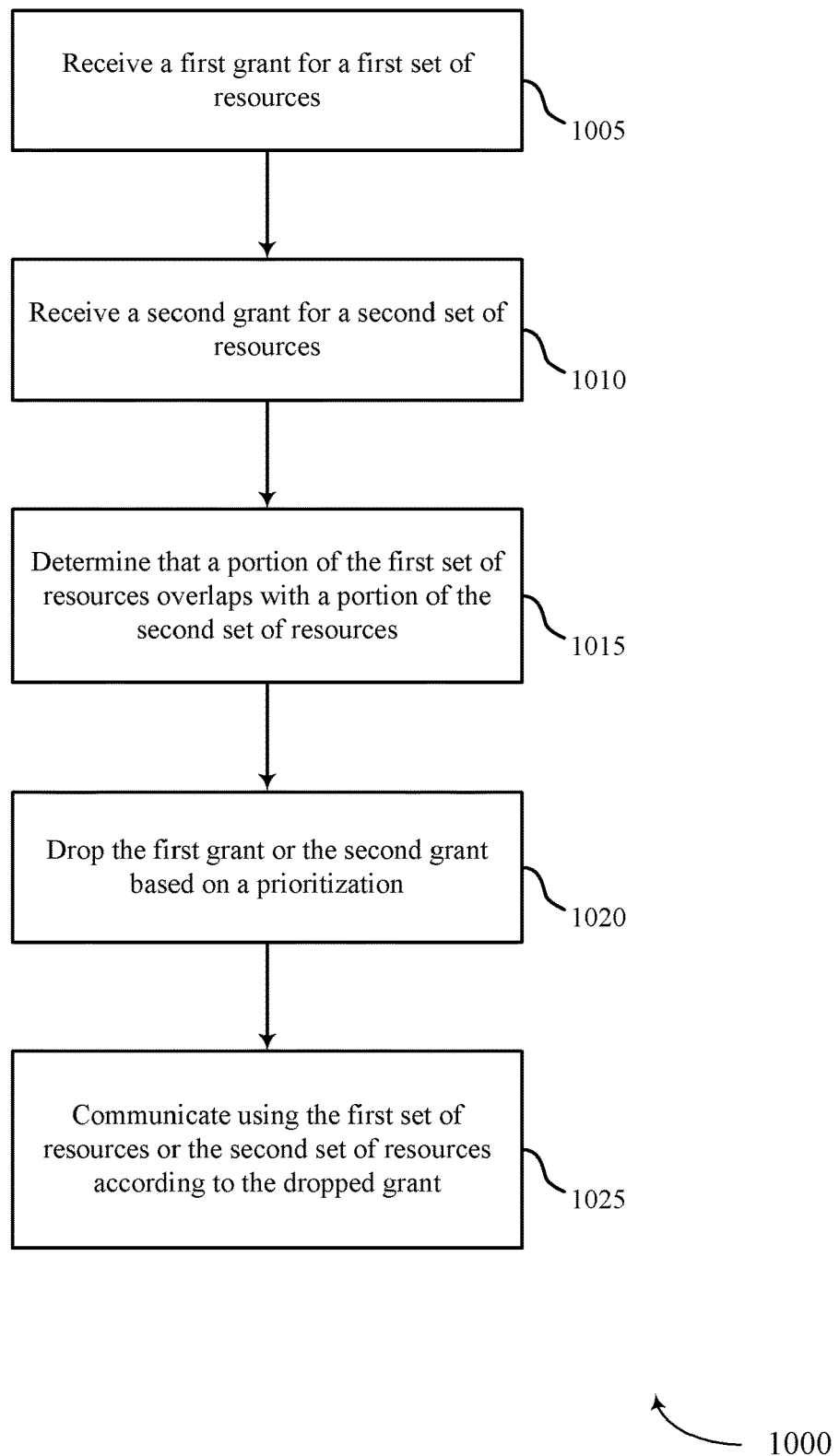

FIG. 10 shows a flowchart illustrating a method 1000 for bundling or HARQ operation, or both, for enhanced machine-type communication in accordance with various aspects of the present disclosure. The operations of method 1000 may be implemented by a UE 115 or its components as described with reference to FIGS. 1-8. For example, the operations of method 1000 may be performed by the half-duplex timing module 410 as described with reference to FIGS. 4-7. In some examples, a UE 115 may execute a set of codes to control the functional elements of the UE 115 to perform the functions described below. Additionally or alternatively, the UE 115 may perform aspects the functions described below using special-purpose hardware. The method 1000 may also incorporate aspects of method 900 of FIG. 9.

At block 1005, the UE 115 may receive a first grant for a first set of resources as described with reference to FIGS. 2-3. In certain examples, the operations of block 1005 may be performed by the resource identification module 505 as described with reference to FIG. 5.

At block 1010, the UE 115 may receive a second grant for a second set of resources as described with reference to FIGS. 2-3. In certain examples, the operations of block 1010 may be performed by the resource identification module 505 as described with reference to FIG. 5.

At block 1015, the UE 115 may determine that a portion of the first set of resources overlaps with a portion of the second set of resources as described with reference to FIGS. 2-3. In certain examples, the operations of block 1015 may be performed by the overlap identification module 510 as described with reference to FIG. 5.

At block 1020, the UE 115 may drop the first grant or the second grant based on a prioritization as described with reference to FIGS. 2-3. In certain examples, the operations of block 1020 may be performed by the resource identification module 505 as described with reference to FIG. 5.

At block 1025, the UE 115 may communicate using the first set of resources or the second set of resources according to the prioritization between the first grant and the second grant as described with reference to FIGS. 2-3. In certain examples, the operations of block 1025 may be performed by the communication module 515 as described with reference to FIG. 5.

Figure 11:
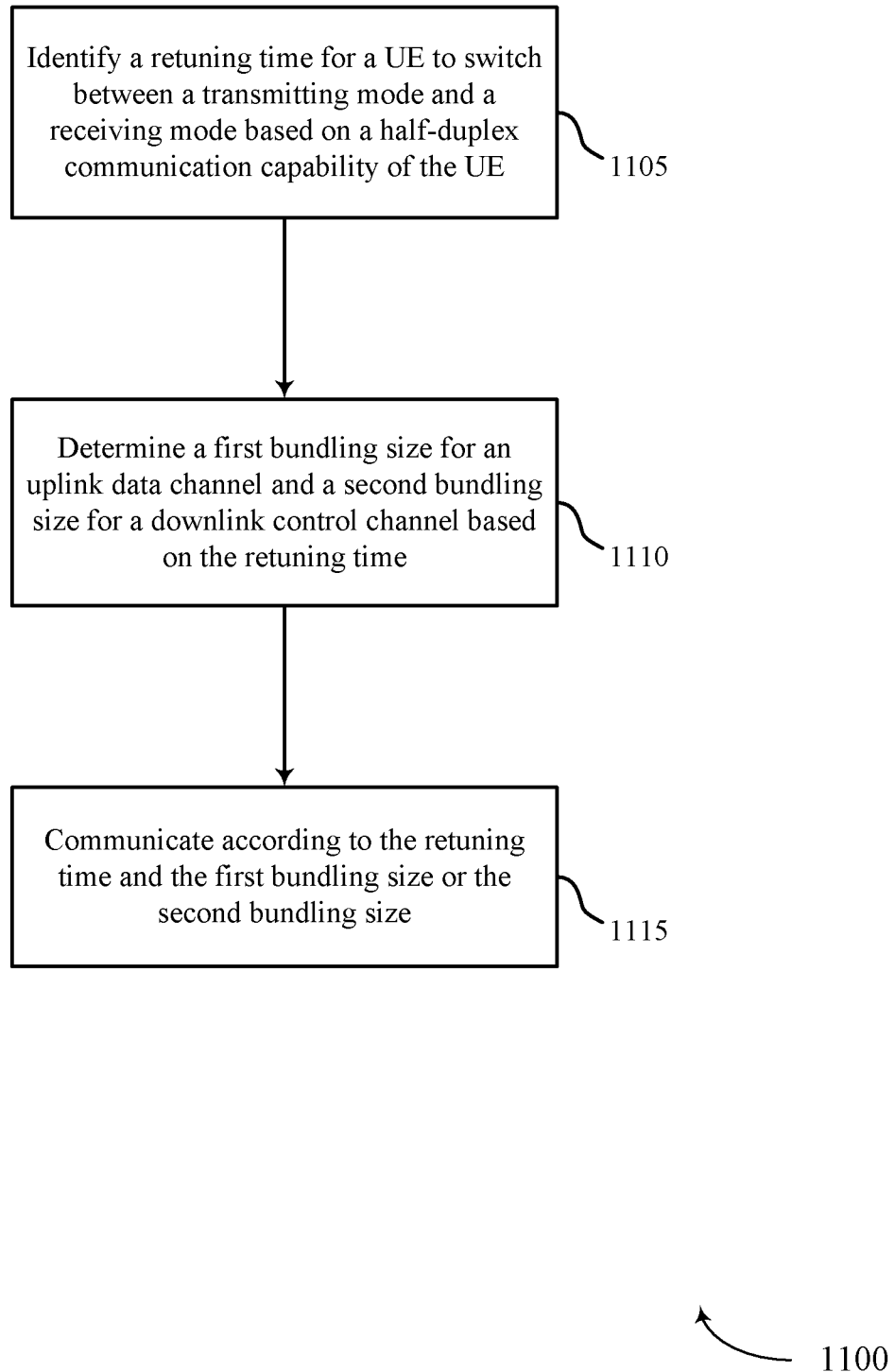

FIG. 11 shows a flowchart illustrating a method 1100 for bundling or HARQ operation, or both, for enhanced machine-type communication in accordance with various aspects of the present disclosure. The operations of method 1100 may be implemented by a UE 115 or base station 105 or its components as described with reference to FIGS. 1-8. For example, the operations of method 1100 may be performed by the half-duplex timing module 410 as described with reference to FIGS. 4-7. In some examples, a UE 115 or base station 105 may execute a set of codes to control the functional elements of the UE 115 or base station 105 to perform the functions described below. Additionally or alternatively, the UE 115 or base station 105 may perform aspects the functions described below using special-purpose hardware.

At block 1105, the UE 115 or base station 105 may identify a retuning time for a UE to switch between a transmitting mode and a receiving mode based on a half-duplex communication capability of the UE as described with reference to FIGS. 2-3. In certain examples, the operations of block 1105 may be performed by the retuning module 605 as described with reference to FIG. 6.

At block 1110, the UE 115 or base station 105 may determine a first bundling size for an uplink data channel and a second bundling size for a downlink control channel based on the retuning time as described with reference to FIGS. 2-3. In certain examples, the operations of block 1110 may be performed by the bundling module 610 as described with reference to FIG. 6.

At block 1115, the UE 115 or base station 105 may communicate according to the retuning time and the first bundling size or the second bundling size as described with reference to FIGS. 2-3. In certain examples, the operations of block 1115 may be performed by the communication module 515 as described with reference to FIG. 5.

Figure 12:
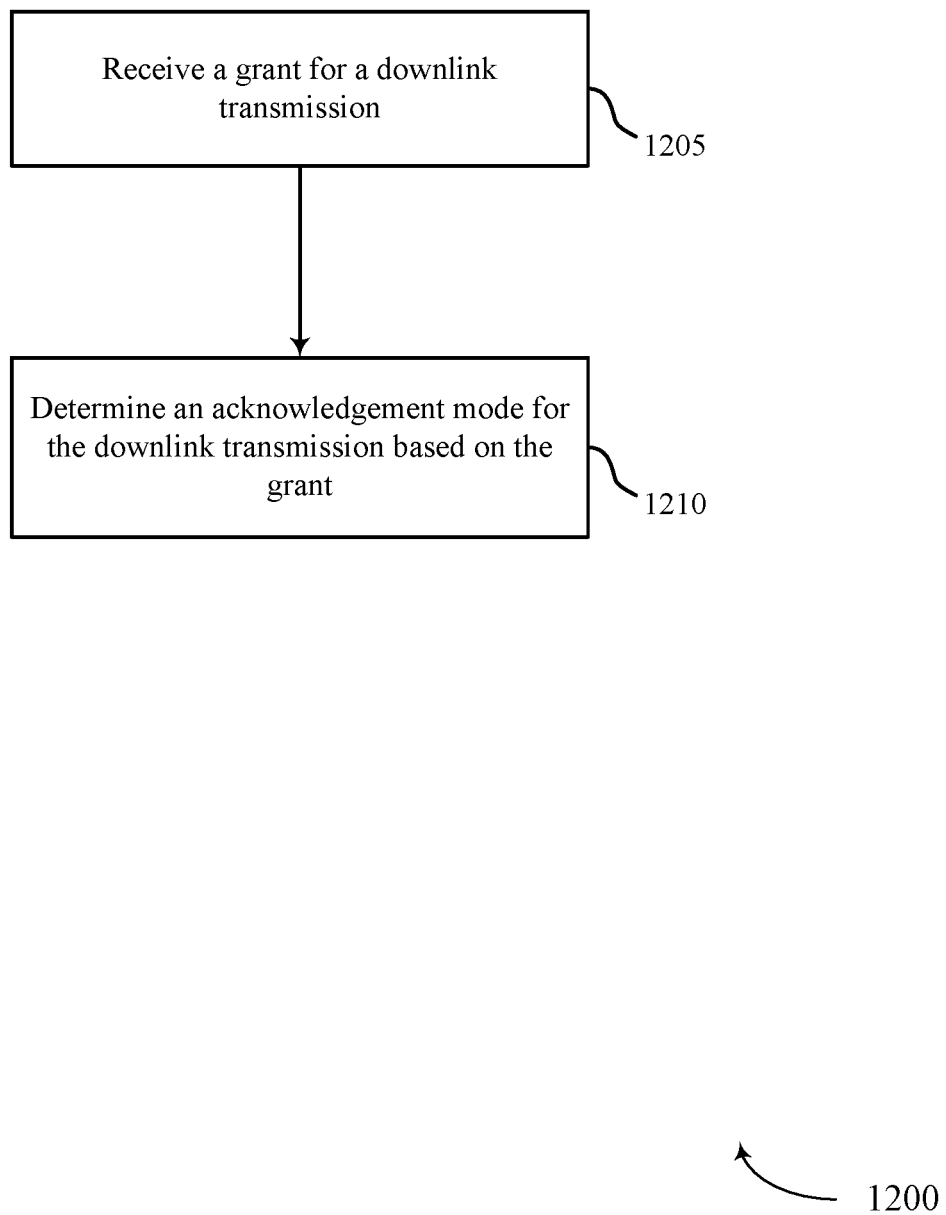

FIG. 12 shows a flowchart illustrating a method 1200 for bundling or HARQ operation, or both, for enhanced machine-type communication in accordance with various aspects of the present disclosure. The operations of method 1200 may be implemented by a UE 115 or its components as described with reference to FIGS. 1-8. For example, the operations of method 1200 may be performed by the half-duplex timing module 410 as described with reference to FIGS. 4-7. In some examples, a UE 115 may execute a set of codes to control the functional elements of the UE 115 to perform the functions described below. Additionally or alternatively, the UE 115 may perform aspects the functions described below using special-purpose hardware.

At block 1205, the UE 115 may receive a grant for a downlink transmission as described with reference to FIGS. 2-3. In certain examples, the operations of block 1205 may be performed by the resource identification module 505 as described with reference to FIG. 5.

At block 1210, the UE 115 may determine an acknowledgement mode for the downlink transmission based on the grant as described with reference to FIGS. 2-3. In certain examples, the operations of block 1210 may be performed by the acknowledgement mode module 615 as described with reference to FIG. 6.

Figure 13:
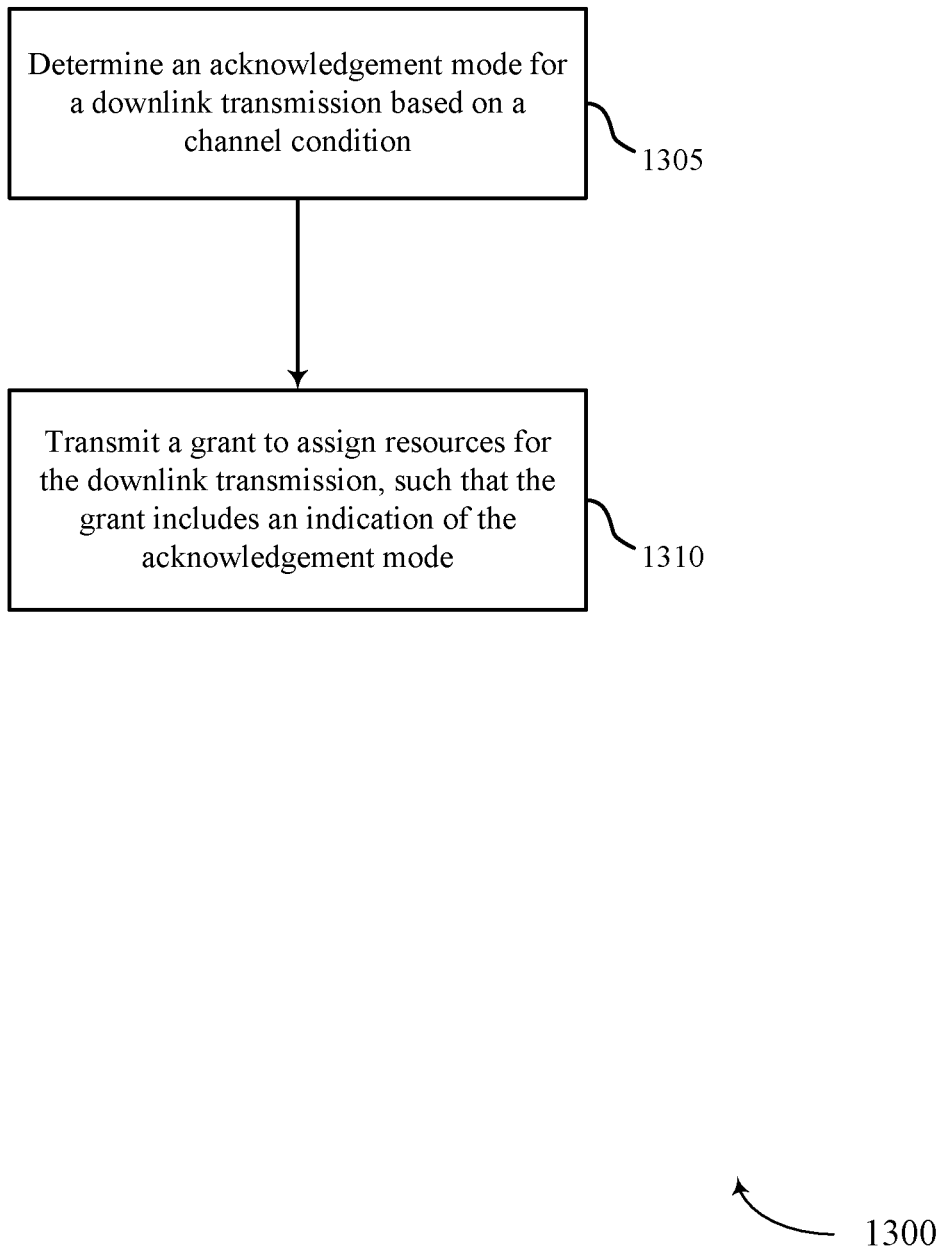

FIG. 13 shows a flowchart illustrating a method 1300 for bundling or HARQ operation, or both, for enhanced machine-type communication in accordance with various aspects of the present disclosure. The operations of method 1300 may be implemented by a base station 105 or its components as described with reference to FIGS. 1-8. For example, the operations of method 1300 may be performed by the half-duplex timing module 410 as described with reference to FIGS. 4-7. In some examples, a base station 105 may execute a set of codes to control the functional elements of the base station 105 to perform the functions described below. Additionally or alternatively, the base station 105 may perform aspects the functions described below using special-purpose hardware.

At block 1305, the base station 105 may determine an acknowledgement mode for a downlink transmission based on a channel condition as described with reference to FIGS. 2-3. In certain examples, the operations of block 1305 may be performed by the acknowledgement mode module 615 as described with reference to FIG. 6.

At block 1310, the base station 105 may transmit a grant to assign resources for the downlink transmission, where the grant includes an indication of the acknowledgement mode as described with reference to FIGS. 2-3. In certain examples, the operations of block 1310 may be performed by the resource identification module 505 as described with reference to FIG. 5.

Figure 14:
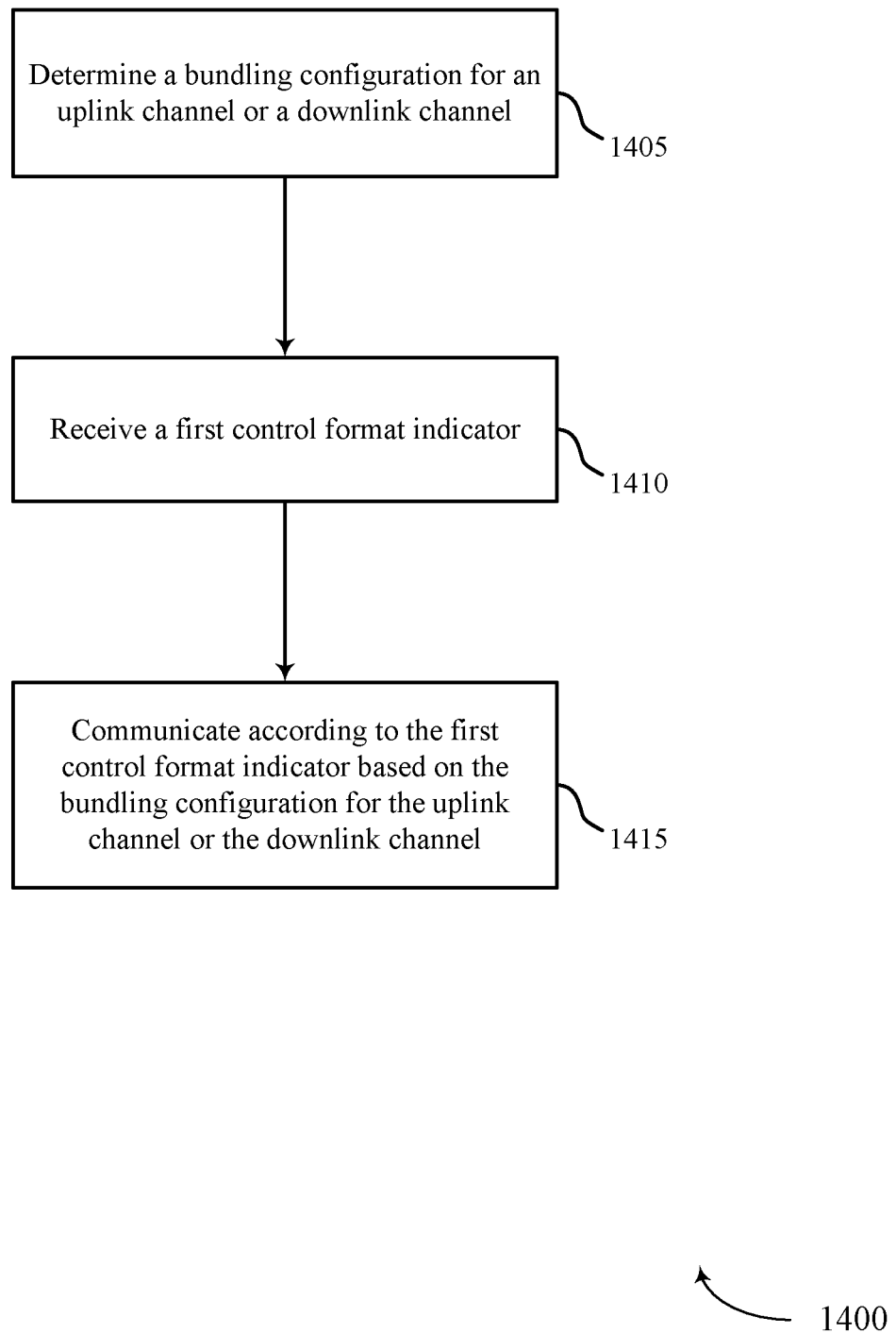

FIG. 14 shows a flowchart illustrating a method 1400 for bundling or HARQ operation, or both, for enhanced machine-type communication in accordance with various aspects of the present disclosure. The operations of method 1400 may be implemented by a UE 115 or its components as described with reference to FIGS. 1-8. For example, the operations of method 1400 may be performed by the half-duplex timing module 410 as described with reference to FIGS. 4-7. In some examples, a UE 115 may execute a set of codes to control the functional elements of the UE 115 to perform the functions described below. Additionally or alternatively, the UE 115 may perform aspects the functions described below using special-purpose hardware.

At block 1405, the UE 115 may determine a bundling configuration for an uplink channel or a downlink channel as described with reference to FIGS. 2-3. In certain examples, the operations of block 1405 may be performed by the bundling module 610 as described with reference to FIG. 6.

At block 1410, the UE 115 may receive a first control format indicator as described with reference to FIGS. 2-3. In certain examples, the operations of block 1410 may be performed by the CFI module 620 as described with reference to FIG. 6.

At block 1415, the UE 115 may communicate according to the first control format indicator based on the bundling configuration for the uplink channel or the downlink channel as described with reference to FIGS. 2-3. In certain examples, the operations of block 1415 may be performed by the communication module 515 as described with reference to FIG. 5.

Figure 15:
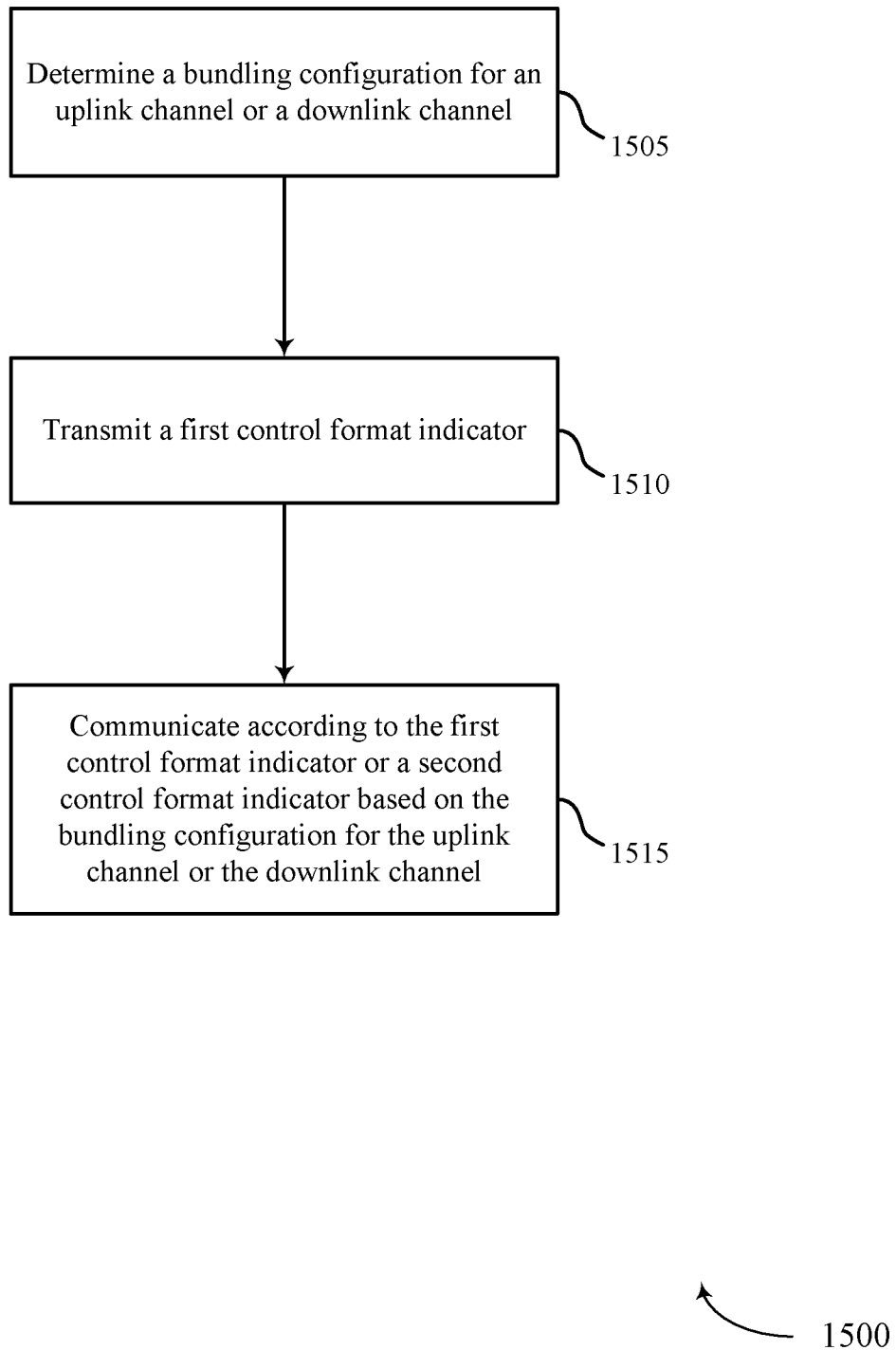

FIG. 15 shows a flowchart illustrating a method 1500 for bundling or HARQ operation, or both, for enhanced machine-type communication in accordance with various aspects of the present disclosure. The operations of method 1500 may be implemented by a base station 105 or its components as described with reference to FIGS. 1-8. For example, the operations of method 1500 may be performed by the half-duplex timing module 410 as described with reference to FIGS. 4-7. In some examples, a base station 105 may execute a set of codes to control the functional elements of the base station 105 to perform the functions described below. Additionally or alternatively, the base station 105 may perform aspects the functions described below using special-purpose hardware. The method 1500 may also incorporate aspects of method 1400 of FIG. 14.

At block 1505, the base station 105 may determine a bundling configuration for an uplink channel or a downlink channel as described with reference to FIGS. 2-3. In certain examples, the operations of block 1505 may be performed by the bundling module 610 as described with reference to FIG. 6.

At block 1510, the base station 105 may transmit a first control format indicator as described with reference to FIGS. 2-3. In certain examples, the operations of block 1510 may be performed by the CFI module 620 as described with reference to FIG. 6.

At block 1515, the base station 105 may communicate according to the first control format indicator or a second control format indicator based on the bundling configuration for the uplink channel or the downlink channel as described with reference to FIGS. 2-3. In certain examples, the operations of block 1515 may be performed by the communication module 515 as described with reference to FIG. 5.

Figure 16:
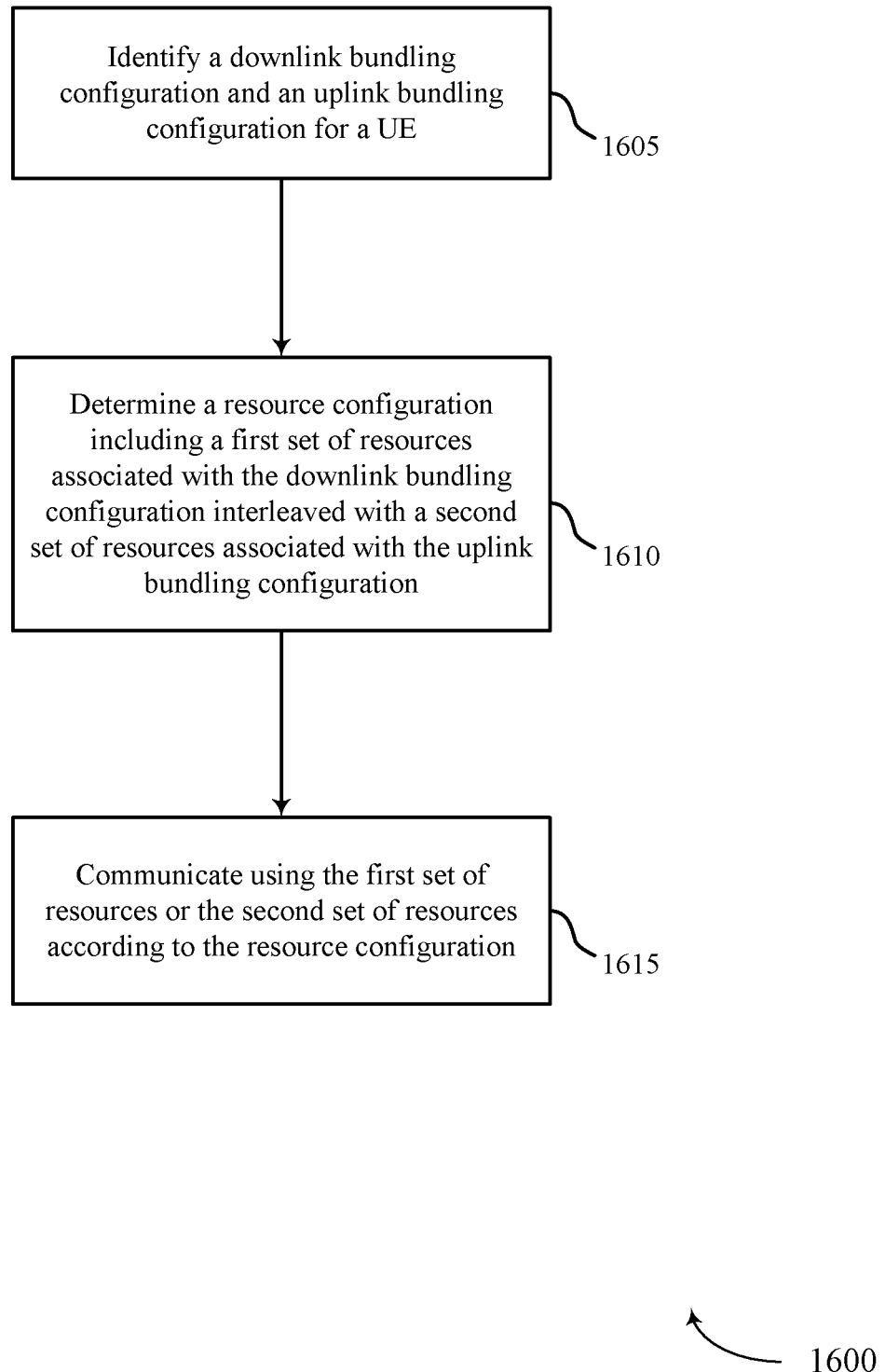

FIG. 16 shows a flowchart illustrating a method 1600 for bundling or HARQ operation, or both, for enhanced machine-type communication in accordance with various aspects of the present disclosure. The operations of method 1600 may be implemented by a UE 115 or base station 105 or its components as described with reference to FIGS. 1-8. For example, the operations of method 1600 may be performed by the half-duplex timing module 410 as described with reference to FIGS. 4-7. In some examples, a UE 115 or base station 105 may execute a set of codes to control the functional elements of the UE 115 or base station 105 to perform the functions described below. Additionally or alternatively, the UE 115 or base station 105 may perform aspects the functions described below using special-purpose hardware.

At block 1605, the UE 115 or base station 105 may identify a downlink bundling configuration and an uplink bundling configuration for a UE as described with reference to FIGS. 2-3. In certain examples, the operations of block 1605 may be performed by the bundling module 610 as described with reference to FIG. 6.

At block 1610, the UE 115 or base station 105 may determine a resource configuration for uplink and downlink communications including a first set of resources associated with the downlink bundling configuration interleaved with a second set of resources associated with the uplink bundling configuration as described with reference to FIGS. 2-3. In certain examples, the operations of block 1610 may be performed by the resource identification module 505 as described with reference to FIG. 5.

At block 1615, the UE 115 or base station 105 may communicate using the first set of resources or the second set of resources according to the resource configuration as described with reference to FIGS. 2-3. In certain examples, the operations of block 1615 may be performed by the communication module 515 as described with reference to FIG. 5.

Figure 17:
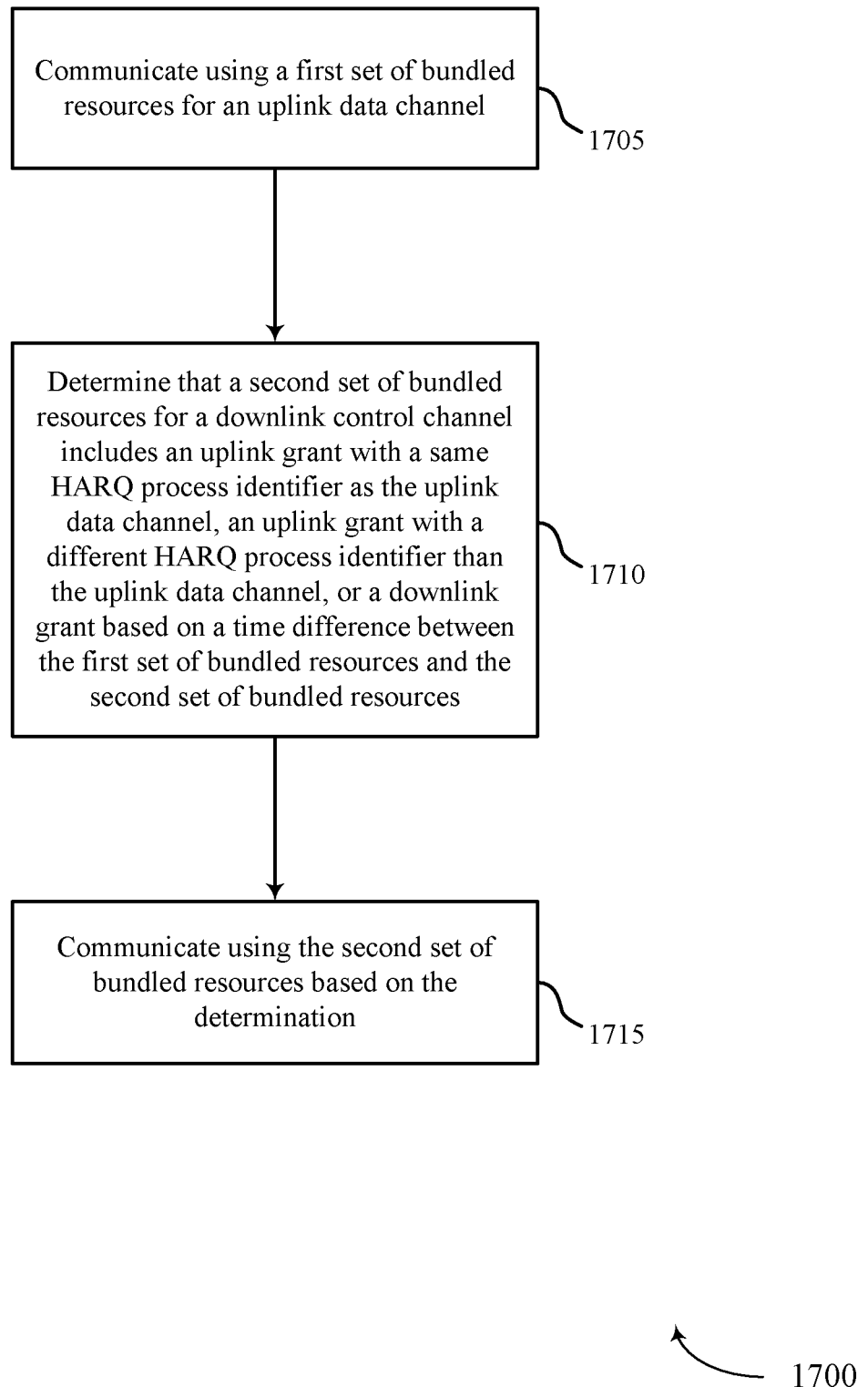

FIG. 17 shows a flowchart illustrating a method 1700 for bundling or HARQ operation, or both, for enhanced machine-type communication in accordance with various aspects of the present disclosure. The operations of method 1700 may be implemented by a UE 115 or base station 105 or its components as described with reference to FIGS. 1-8. For example, the operations of method 1700 may be performed by the half-duplex timing module 410 as described with reference to FIGS. 4-7. In some examples, a UE 115 or base station 105 may execute a set of codes to control the functional elements of the UE 115 or base station 105 to perform the functions described below. Additionally or alternatively, the UE 115 or base station 105 may perform aspects the functions described below using special-purpose hardware.

At block 1705, the UE 115 or base station 105 may communicate using a first set of bundled resources for an uplink data channel as described with reference to FIGS. 2-3. In certain examples, the operations of block 1705 may be performed by the communication module 515 as described with reference to FIG. 5.

At block 1710, the UE 115 or base station 105 may determine that a second set of bundled resources for a downlink control channel includes an uplink grant with a same HARQ process identifier as the uplink data channel, an uplink grant with a different HARQ process identifier than the uplink data channel, or a downlink grant as described with reference to FIGS. 2-3. In certain examples, the operations of block 1710 may be performed by the resource identification module 505 as described with reference to FIG. 5.

At block 1715, the UE 115 or base station 105 may communicate using the second set of bundled resources based on the determination as described with reference to FIGS. 2-3. In certain examples, the operations of block 1715 may be performed by the communication module 515 as described with reference to FIG. 5.

Figure 18:
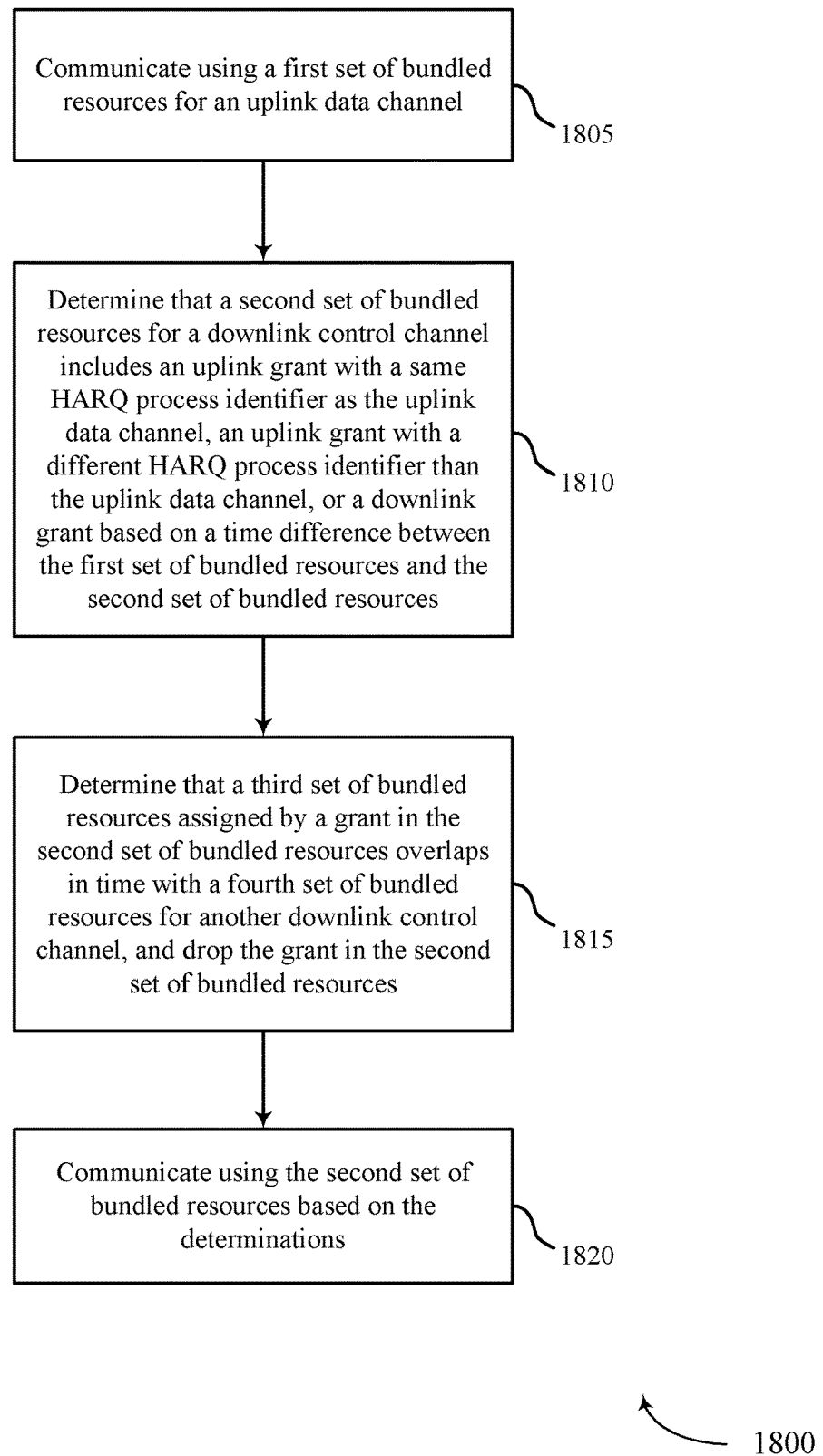

FIG. 18 shows a flowchart illustrating a method 1800 for bundling or HARQ operation, or both, for enhanced machine-type communication in accordance with various aspects of the present disclosure. The operations of method 1800 may be implemented by a UE 115 or base station 105 or its components as described with reference to FIGS. 1-8. For example, the operations of method 1800 may be performed by the half-duplex timing module 410 as described with reference to FIGS. 4-7. In some examples, a UE 115 or base station 105 may execute a set of codes to control the functional elements of the UE 115 or base station 105 to perform the functions described below. Additionally or alternatively, the UE 115 or base station 105 may perform aspects the functions described below using special-purpose hardware. The method 1800 may also incorporate aspects of method 1700 of FIG. 17.

At block 1805, the UE 115 or base station 105 may communicate using a first set of bundled resources for an uplink data channel as described with reference to FIGS. 2-3. In certain examples, the operations of block 1805 may be performed by the communication module 515 as described with reference to FIG. 5.

At block 1810, the UE 115 or base station 105 may determine that a second set of bundled resources for a downlink control channel includes an uplink grant with a same HARQ process identifier as the uplink data channel, an uplink grant with a different HARQ process identifier than the uplink data channel, or a downlink grant based on a time difference between the first set of bundled resources and the second set of bundled resources as described with reference to FIGS. 2-3. In certain examples, the operations of block 1810 may be performed by the resource identification module 505 as described with reference to FIG. 5.

At block 1815, the UE 115 or base station 105 may determine that a third set of bundled resources assigned by a grant in the second set of bundled resources overlaps in time with a fourth set of bundled resources for another downlink control channel, and may drop the grant in the second set of bundled resources as described with reference to FIGS. 2-3. In certain examples, the operations of block 1815 may be performed by the resource identification module 505 as described with reference to FIG. 5.

At block 1820, the UE 115 or base station 105 may communicate using the second set of bundled resources based on the determinations as described with reference to FIGS. 2-3. In certain examples, the operations of block 1820 may be performed by the communication module 515 as described with reference to FIG. 5.

Figure 19:
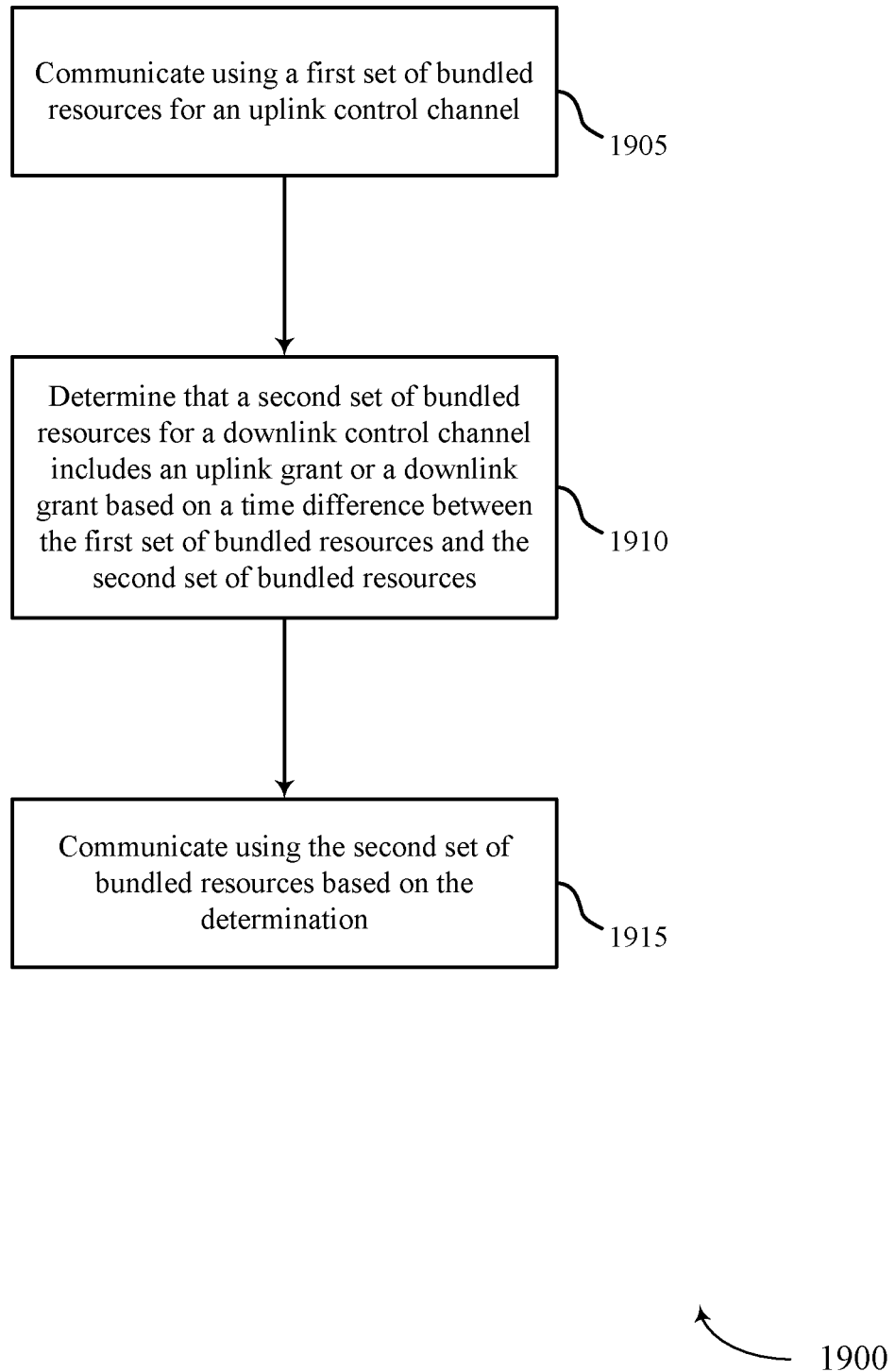

FIG. 19 shows a flowchart illustrating a method 1900 for bundling or HARQ operation, or both, for enhanced machine-type communication in accordance with various aspects of the present disclosure. The operations of method 1900 may be implemented by a UE 115 or base station 105 or its components as described with reference to FIGS. 1-8. For example, the operations of method 1900 may be performed by the half-duplex timing module 410 as described with reference to FIGS. 4-7. In some examples, a UE 115 or base station 105 may execute a set of codes to control the functional elements of the UE 115 or base station 105 to perform the functions described below. Additionally or alternatively, the UE 115 or base station 105 may perform aspects the functions described below using special-purpose hardware.

At block 1905, the UE 115 or base station 105 may communicate using a first set of bundled resources for an uplink control channel as described with reference to FIGS. 2-3. In certain examples, the operations of block 1905 may be performed by the communication module 515 as described with reference to FIG. 5.

At block 1910, the UE 115 or base station 105 may determine that a second set of bundled resources for a downlink control channel includes an uplink grant or a downlink grant based on a time difference between the first set of bundled resources and the second set of bundled resources as described with reference to FIGS. 2-3. In certain examples, the operations of block 1910 may be performed by the resource identification module 505 as described with reference to FIG. 5.

At block 1915, the UE 115 or base station 105 may communicate using the second set of bundled resources based on the determination as described with reference to FIGS. 2-3. In certain examples, the operations of block 1915 may be performed by the communication module 515 as described with reference to FIG. 5.

Thus, methods 900, 1000, 1100, 1200, 1300, 1400, 1500, 1600, 1700, 1800, and 1900 may provide for bundling or HARQ operation for enhanced machine-type communication. It should be noted that methods 900, 1000, 1100, 1200, 1300, 1400, 1500, 1600, 1700, 1800, and 1900 describe possible implementation, and that the operations and the steps may be rearranged or otherwise modified such that other implementations are possible. In some examples, aspects from two or more of the methods 900, 1000, 1100, 1200, 1300, 1400, 1500, 1600, 1700, 1800, and 1900 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, Universal Mobile Telecommunications System (UMTS), LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can includes RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
communicating using a first set of bundled resources for an uplink data channel;
determining that a second set of bundled resources for a downlink control channel comprises an uplink grant with a same hybrid automatic repeat request (HARQ) process identifier as the uplink data channel, an uplink grant with a different hybrid automatic repeat HARQ process identifier than the uplink data channel, or a downlink grant;
identifying a time difference between the first set of bundled resources and the second set of bundled resources; and
communicating using the second set of bundled resources based at least in part on the determining and the identifying.

2. The method of claim 1, wherein the first set of bundled resources comprises a first bundling size that is less than or equal to a first threshold and the second set of bundled resources comprises a second bundling size that is less than or equal to a second threshold, and wherein the first and second thresholds are known a priori to a user equipment or base station.

3. The method of claim 1, wherein the determination of whether the second set of bundled resources comprises the uplink grant is based at least in part on a periodicity of the second set of bundled resources or a maximum bundle size of the first set of bundled resources.

4. The method of claim 1, further comprising:
determining that a third set of bundled resources assigned by a grant in the second set of bundled resources overlaps in time with a fourth set of bundled resources for another downlink control channel, wherein communicating using the second set of bundled resources comprises dropping the grant in the second set of bundled resources.

5. The method of claim 1, further comprising:
determining that the second set of bundled resources comprises the uplink grant with the same HARQ process identifier as the uplink data channel, wherein communicating using the second set of bundled resources comprises dropping the uplink grant based at least on identifying the time difference.

6. The method of claim 1, further comprising:
determining the time difference between the first set of bundled resources and the second set of bundled resources, wherein communicating using the second set of bundled resources is based at least in part on the time difference.

7. The method of claim 6, wherein communicating using the first set of bundled resources comprises using a subset of the first set of bundled resources.

8. A method of wireless communication, comprising:
receiving a first grant for a first set of resources;
receiving a second grant for a second set of resources;
determining that a portion of the first set of resources indicated by the received first grant overlaps with a portion of the second set of resources indicated by the received second grant; and
communicating using the first set of resources or the second set of resources according to a prioritization between the first grant and the second grant based at least in part on the determination.

9. The method of claim 8, further comprising:
dropping the first grant or the second grant based at least in part on the prioritization.

10. The method of claim 8, wherein communicating using the first set of resources or the second set of resources comprises:
communicating using the first set of resources and a non-overlapped portion of the second set of resources.

11. The method of claim 8, wherein the first and second sets of resources each comprise bundled resources of an uplink channel or a downlink channel.

12. An apparatus for wireless communication, comprising:
means for communicating using a first set of bundled resources for an uplink data channel;
means for determining that a second set of bundled resources for a downlink control channel comprises an uplink grant with a same hybrid automatic repeat request (HARQ) process identifier as the uplink data channel, an uplink grant with a different HARQ process identifier than the uplink data channel, or a downlink grant;
means for identifying a time difference between the first set of bundled resources and the second set of bundled resources; and
means for communicating using the second set of bundled resources based at least in part on the determining and the identifying.

13. The apparatus of claim 12, wherein the first set of bundled resources comprises a first bundling size that is less than or equal to a first threshold and the second set of bundled resources comprises a second bundling size that is less than or equal to a second threshold, and wherein the first and second thresholds are known a priori to a user equipment or base station.

14. The apparatus of claim 12, wherein the determination of whether the second set of bundled resources comprises the uplink grant is based at least in part on a periodicity of the second set of bundled resources or a maximum bundle size of the first set of bundled resources.

15. The apparatus of claim 12, further comprising:
means for determining that a third set of bundled resources assigned by a grant in the second set of bundled resources overlaps in time with a fourth set of bundled resources for another downlink control channel, wherein communicating using the second set of bundled resources comprises dropping the grant in the second set of bundled resources.

16. The apparatus of claim 12, further comprising:
means for determining that the second set of bundled resources comprises the uplink grant with the same HARQ process identifier as the uplink data channel, wherein communicating using the second set of bundled resources comprises dropping the uplink grant based at least on identifying the time difference.

17. The apparatus of claim 12, further comprising:
means for determining the time difference between the first set of bundled resources and the second set of bundled resources, wherein communicating using the second set of bundled resources is based at least in part on the time difference.

18. The apparatus of claim 17, wherein the means for communicating using the first set of bundled resources comprises using a subset of the first set of bundled resources.

19. An apparatus for wireless communication, comprising:
means for receiving a first grant for a first set of resources;
means for receiving a second grant for a second set of resources;
means for determining that a portion of the first set of resources indicated by the received first grant overlaps with a portion of the second set of resources indicated by the received second grant; and
means for communicating using the first set of resources or the second set of resources according to a prioritization between the first grant and the second grant based at least in part on the determination.

20. The apparatus of claim 19, further comprising:
means for dropping the first grant or the second grant based at least in part on the prioritization.

21. The apparatus of claim 19, wherein the means for communicating using the first set of resources or the second set of resources comprises:
means for communicating using the first set of resources and a non-overlapped portion of the second set of resources.

22. The apparatus of claim 19, wherein the first and second sets of resources each comprise bundled resources of an uplink channel or a downlink channel.

23. An apparatus for wireless communication, comprising:
a processor;
memory in electronic communication with the processor; and
instructions stored in the memory and operable, when executed by the processor, to cause the apparatus to:
communicate using a first set of bundled resources for an uplink data channel;
determine that a second set of bundled resources for a downlink control channel comprises an uplink grant with a same hybrid automatic repeat request (HARQ) process identifier as the uplink data channel, an uplink grant with a different hybrid automatic repeat request (HARQ) process identifier than the uplink data channel, or a downlink grant;
identify a time difference between the first set of bundled resources and the second set of bundled resources; and
communicate using the second set of bundled resources based at least in part on the determination and the identification.

24. The apparatus of claim 23, wherein the first set of bundled resources comprises a first bundling size that is less than or equal to a first threshold and the second set of bundled resources comprises a second bundling size that is less than or equal to a second threshold, and wherein the first and second thresholds are known a priori to a user equipment or base station.

25. The apparatus of claim 23, wherein the determination of whether the second set of bundled resources comprises the uplink grant is based at least in part on a periodicity of the second set of bundled resources or a maximum bundle size of the first set of bundled resources.

26. The apparatus of claim 23, wherein the instructions are operable to cause the apparatus to:
determine that a third set of bundled resources assigned by a grant in the second set of bundled resources overlaps in time with a fourth set of bundled resources for another downlink control channel, wherein communicating using the second set of bundled resources comprises dropping the grant in the second set of bundled resources.

27. The apparatus of claim 23, wherein the instructions are operable to cause the apparatus to:
determine that the second set of bundled resources comprises the uplink grant with the same HARQ process identifier as the uplink data channel, wherein communicating using the second set of bundled resources comprises dropping the uplink grant based at least on identifying the time difference.

28. The apparatus of claim 23, wherein the instructions are operable to cause the apparatus to:
determine the time difference between the first set of bundled resources and the second set of bundled resources, wherein communicating using the second set of bundled resources is based at least in part on the time difference.

29. The apparatus of claim 28, wherein communicating using the first set of bundled resources comprises using a subset of the first set of bundled resources.

30. An apparatus for wireless communication, comprising:
a processor;
memory in electronic communication with the processor; and
instructions stored in the memory and operable, when executed by the processor, to cause the apparatus to:
receive a first grant for a first set of resources;
receive a second grant for a second set of resources;
determine that a portion of the first set of resources indicated by the received first grant overlaps with a portion of the second set of resources indicated by the received second grant; and
communicate using the first set of resources or the second set of resources according to a prioritization between the first grant and the second grant based at least in part on the determination.

31. The apparatus of claim 30, wherein the instructions are operable to cause the apparatus to:

drop the first grant or the second grant based at least in part on the prioritization.

32. The apparatus of claim 30, wherein the instructions are operable to cause the apparatus to:
communicate using the first set of resources and a non-overlapped portion of the second set of resources.

33. The apparatus of claim 30, wherein the first and second sets of resources each comprise bundled resources of an uplink channel or a downlink channel.

34. A non-transitory computer-readable medium storing code for wireless communication, the code comprising instructions executable to:
communicate using a first set of bundled resources for an uplink data channel;
determine that a second set of bundled resources for a downlink control channel comprises an uplink grant with a same hybrid automatic repeat request (HARQ) process identifier as the uplink data channel, an uplink grant with a different hybrid automatic repeat request (HARQ) process identifier than the uplink data channel, or a downlink grant;
identify a time difference between the first set of bundled resources and the second set of bundled resources; and
communicate using the second set of bundled resources based at least in part on the determination and the identification.

35. A non-transitory computer-readable medium storing code for wireless communication, the code comprising instructions executable to:
receive a first grant for a first set of resources;
receive a second grant for a second set of resources;
determine that a portion of the first set of resources indicated by the received first grant overlaps with a portion of the second set of resources indicated by the received second grant; and
communicate using the first set of resources or the second set of resources according to a prioritization between the first grant and the second grant based at least in part on the determination.

* * * * *